United States Patent
Leymaster et al.

(10) Patent No.: US 6,182,095 B1
(45) Date of Patent: Jan. 30, 2001

(54) DOCUMENT GENERATOR

(75) Inventors: Mark Leymaster, Silver Spring, MD (US); Preston Abbott, Guilford; William C. Steward, Stamford, both of CT (US); Glenn Patsch, Cleveland, OH (US); Robert Spaulding, Palatine, IL (US)

(73) Assignee: General Electric Capital Corporation, Stamford, CT (US)

(*) Notice: Under 35 U.S.C. 154(b), the term of this patent shall be extended for 0 days.

(21) Appl. No.: 09/070,286

(22) Filed: Apr. 30, 1998

(Under 37 CFR 1.47)

(51) Int. Cl.$^7$ ..................................................... G06F 17/21
(52) U.S. Cl. ............................................. 707/515; 706/46
(58) Field of Search .................................. 707/515, 531, 707/530, 513, 511, 514, 516; 345/302; 706/45, 46

(56) References Cited

U.S. PATENT DOCUMENTS

| | | | |
|---|---|---|---|
| 4,663,615 | * 5/1987 | Hernandez et al. | 345/340 |
| 4,831,526 | * 5/1989 | Luchs et al. | 705/4 |
| 4,962,475 | * 10/1990 | Hernandez et al. | 707/515 |
| 5,144,555 | * 9/1992 | Takadachi et al. | 707/530 |
| 5,267,155 | * 11/1993 | Buchanan et al. | 707/540 |
| 5,272,623 | * 12/1993 | Grubb et al. | 717/1 |
| 5,511,193 | * 4/1996 | Tung et al. | 709/329 |
| 5,630,126 | * 5/1997 | Redpath | 707/103 |
| 5,634,019 | * 5/1997 | Koppolu et al. | 345/335 |
| 5,655,130 | * 8/1997 | Dodge et al. | 707/511 |
| 5,659,676 | * 8/1997 | Redpath | 707/515 |
| 5,669,005 | * 9/1997 | Curbow et al. | 707/523 |
| 5,671,429 | * 9/1997 | Tanaka | 707/530 |
| 5,692,206 | * 11/1997 | Shirley et al. | 707/531 |
| 5,740,455 | * 4/1998 | Pavley et al. | 707/515 |
| 5,742,816 | * 4/1998 | Barr et al. | 707/104 |
| 5,953,718 | * 9/1999 | Wical | 707/5 |

OTHER PUBLICATIONS

"Frame readies pair of new tools for SGML structured documents: FrameBuilder due for Mac next year", MacWeek, v6, n35, p6(1), Oct. 1992.*

Mark Brown, Special Edition Using Netscape 3.0, Macmillan Computer Publishing, Ch. 26, ISBN: 07897090ax, Oct. 1992.*

* cited by examiner

Primary Examiner—Joseph H. Feild
(74) Attorney, Agent, or Firm—Clifford Chance Rogers & Wells LLP

(57) ABSTRACT

The invention features computer-based methods and apparatuses to automate document generation. The methods include user interaction to identify a collection of available modifiable text segments and user interaction to identify customization data. The identified text segments are used to form the package of interrelated documents and the customization data can be used to complete the identified text segments. The customized package of interrelated documents is automatically assembling based on the identified collection and customization data. The method may also include identifying a collection of information element questions that will be used to request information element data from a user. Interacting with a user to identify associations being between the collection of information element questions and a collection of available modifiable text segments. Interacting with a user to identifying a collection of document structure questions that will be used to request document structure data from a user, and identifying associations between the collection of document structure questions and ones of the collection of available modifiable text segments. The invention also features a computer-based apparatus for generating documentation. The apparatus includes means for identifying a collection of available modifiable text segments. The identified text segments can be used to form a package of customized interrelated documents. The apparatus also includes means for identifying customization data needed to complete the modifiable text segments, and means for automatically assembling the customized package of interrelated documents based on the identified collection and customization data.

24 Claims, 28 Drawing Sheets

| | |
|---|---|
| ☐ GE CAPITAL DEAL GENERATOR: TEST_JM4 | ☐ ☐ ✕ |

```
FILE  UTILITIES  HELP
```

| DEAL DEFINITION | DEAL STRUCTURE | DEAL INFORMATION |

CONTRACT COMPONENTS:

| | |
|---|---|
| 701 — EITHER CLICK HERE TO SELECT A SINGLE BORROWER — NO ACQUISITION STABLE DOCUMENT SET: | ☐ — 721 |
| 702 — OR CLICK HERE FOR A CO-BORROWER — NO ACQUISITION STABLE AGREEMENT DOCUMENT SET: | ☑ — 722 |
| 703 — EITHER CLICK HERE TO INCLUDE A CO-BORROWER LOAN & SECURITY AGREEMENT INCLUDING A JOINT TERM LOAN & SCH. A TO F + EX. A TO J: | ☑ — 723 |
| 704 — EITHER CLICK HERE TO INCLUDE A TWO-BORROWER LOAN & SECURITY AGREEMENT WITH BOTH A JOINT TERM LOAN AND A LETTER OF CREDIT SUBFACILITY + SCH. A TO F: | ☑ — 724 |
| 705 — OR CLICK HERE TO INCLUDE A TWO-BORROWER LOAN & SECURITY AGREEMENT INCLUDING A JOINT TERM LOAN WITHOUT A LETTER OF CREDIT SUBFACILITY + SCH. A TO F: | ☐ — 725 |
| 706 — CLICK TO SEPARATE TWO-BORROWER FINANCIAL COVENANTS (SCHEDULE G) | ☑ — 726 |
| 707 — (MANDATORY) CLICK HERE TO INCLUDE THE SCHEDULE G HEADER | ☑ — 727 |
| 708 — (OPTIONAL) CLICK TO INCLUDE AN INCLUSIVE FIXED CHARGE COVERAGE RATIO FINANCIAL COVENANT: | ☑ — 728 |
| 709 — (OPTIONAL) CLICK TO INCLUDE AN INCLUSIVE MINIMUM NET WORTH FINANCIAL COVENANT: | ☐ — 729 |
| 710 — (OPTIONAL) TO INCLUDE AN INCLUSIVE CAPITAL EXPENDITURE FINANCIAL COVENANT: | ☑ — 730 |
| 711 — (MANDATORY) CLICK TO COMPLETE SCHEDULE G WITH PAGE BREAK. | ☑ — 731 |
| 712 — (MANDATORY) CLICK TO INCLUDE DISCLOSURE SCHEDULE BLANKS & EXHIBITS A THROUGH J FOR COBORROWERS: | ☑ — 732 |

| NEW | SAVE | PRINT Q&A | PRINT UNANSWERED | BUILD DEAL DOCUMENT |

SELECT A CONTRACT COMPONENT TO INCLUDE IN THE GENERATED CONTRACT.     04/20/98 10:35AM

| GE CAPITAL DEAL GENERATOR: TEST_JM4 | □ X |
|---|---|
| FILE UTILITIES SEARCH FOR QUESTION HELP | |
| DEAL DEFINITION | DEAL STRUCTURE | DEAL INFORMATION |

| QUESTION: | ANSWER: |
|---|---|
| WELCOME. IF YOU HAVE ANY SUGGESTIONS OR PROBLEMS, PLEASE USE THE Q:NUMBER IN THE LOWER RIGHT OF THIS SCREEN IT IF INVOLVES THESE QUESTIONS. THANKS. FIRST IS LOAN & | |
| ---NOTE: THIS LOAN & SECURITY AGREEMENT ASSUMES NO CALIFORNIA COLLATERAL AND NO CREDIT PARTY CHARTERED IN CALIFORNIA. IF THIS IS NOT TRUE, BE SURE TO INCLUDE THE | |
| ENTER THE FULL LEGAL NAME OF THE FIRST OF LEADING BORROWER, WHO WILL ALSO BE THE AGENT FOR ITSELF AND THE SECOND BORROWER, NAMED BELOW: | COBORROWER 1 OF 2 LTD |
| ENTER THE FULL LEGAL NAME OF THE SECOND BORROWER, FOR WHOM THE LEADING BORROWER NAMED ABOVE ACTS AS AGENT: | COBORROWER 2 OF 2 LTD |
| ENTER THE DATE GIVEN TO THE LOAN & SECURITY AGREEMENT: | APRIL 20, 1998 |
| ENTER THE NAME OF THE STATE WHERE LEADING BORROWER IS CHARTERED: | NEW YORK |
| CHOOSE THE LEGAL ENTITY AS WHICH THE LEADING BORROWER IS CHARTERED | LIMITED PARTNERSHIP |
| ENTER THE FULL NAME OF THE STATE WHERE THE SECOND BORROWER IS CHARTERED: | [NEED: CHARTER STATE OF BORROWER, 20F2SEP] |
| CHOOSE THE LEGAL ENTITY TYPE AS WHICH THE SECOND BORROWER IS CHARTERED: | [NEED: LEGAL ENTITY OF BORROWER, 20F2SEP] |
| ENTER THE ACCOUNT CAPTION FOR THIS DEAL, PREFIXED FOR THE WORDS "ACCOUNT MANAGER" TO CREATE THE TITLE OF THE GE PERSON RECEIVING NOTICES UNDER THE LOAN | [NEED: THIS DEAL'S ACCOUNT CAPTION] |

| NEW | SAVE | PRINT Q&A | PRINT UNANSWERED | BUILD DEAL DOCUMENT |
|---|---|---|---|---|

PRINT THE QUESTION AND ANSWER REPORT FOR DEALID TEST_JM4 | TEXT | Q: 430

| MULTIPLE CHOICE QUESTION: |
|---|
| CHOOSE THE LEGAL ENTITY AS WHICH THE LEADING BORROWER IS CHARTERED |
| CLICK ON THE DESIRED ANSWER: |
| C CORPORATION |
| S CORPORATION |
| LIMITED PARTNERSHIP |
| GENERAL PARTNERSHIP |
| LIMITED LIABILITY COMPANY |
| (NEED: LEADING BORROWER LEGAL ENTITY TYPE) |

OK    CANCEL

*FIG. 9*

TABLE: STRUCTURE

THE "STRUCTURE" TABLE CONTAINS A THE ENTIRE INVENTORY OF DOCUMENT STRUCTURE QUESTIONS THAT CAN BE RESPONDED TO THE BOOLEAN (SELECTED/NOT-SELECTED) RESPONSES. RESPONSES TO STRUCTURE QUESTIONS DETERMINE THE INPUT DOCUMENT SEGMENTS THAT ARE ASSEMBLED TOGETHER TO FORM A GENERATED DOCUMENT. AS RESPONSES TO STRUCTURE QUESTIONS SELECT DOCUMENTID ELEMENTS, THESE IN TURN DETERMINE THE INFORMATION QUESTIONS (IN THE "QUESTION" TABLE) THAT ARE RELEVANT TO A DEAL.

| FIELD NAME | DATA TYPE | SIZE | COMMENTS |
|---|---|---|---|
| STRUCLINENUM | NUMBER(LONG) | 4 | THE STRUCLINENUM FIELD VALUE IDENTIFIES THE ORDER IN WHICH STRUCTURE QUESTIONS ARE PRESENTED TO A USER. IN GENERAL, QUESTIONS WITH LOWER STRUCLINENUM FIELD VALUES ARE PRESENTED IN A LIST AHEAD OF HIGHER NUMBERED QUESTIONS. NOTE, HOWEVER, DEPENDING ON ANSWERS TO PREVIOUS STRUCTURE QUESTIONS, SUBORDINATE QUESTIONS MAY BE SKIPPED. |
| INDENT | NUMBER(LONG) | 4 | THE INDENT FIELD VALUE HELPS TO DEFINE A HIERARCHY AMONG STRUCTURE QUESTIONS AND DEFINES THE PRESENTATION OF QUESTIONS TO A USER. FOR EXAMPLE, IN DEFINING THE PRESENTATION, AS THE INDENT VALUE IS INCREASED, THE ASSOCIATED QUESTION MAY BE DISPLAYED FURTHER INDENTED FROM A LEFT-HANDED MARGIN. A STRUCTURE QUESTION HIERARCHY MAY INCLUDE PARENT QUESTIONS AT A SELECTED INDENT VALUE AND CHILD QUESTIONS AT A GREATER INDENT VALUE THAN THE PARENT. IN ONE IMPLEMENTATION, A PARENT QUESTION AND ITS CHILD QUESTIONS WILL HAVE SEQUENTIAL STRUCLINENUM VALUES WITH THE CHILD QUESTIONS HAVING A GREATER INDENT VALUE THAN THE PARENT QUESTION. A CHILD QUESTION MAY, IN TURN, BE A PARENT QUESTION RELATIVE TO QUESTIONS HAVING AN INDENT VALUE GREATER THEN THE CHILD QUESTION'S INDENT VALUE. |
| STRUCQUESID | NUMBER(LONG) | 4 | THE STRUCID FIELD STORES A KEY TO A RECORD IN THE "STRUCTURE_QUESTION" TABLE. MULTIPLE RECORDS IN THE "STRUCTURE" TABLE CAN POINT TO THE SAME RECORD IN THE "STRUCTURE_QUESTION" TABLE, SO LONG AS THE MULTIPLE STRUCTURE TABLE RECORDS ARE ISOLATED IN EXCLUSIVE GROUPS CONTROLLED BY STRUCTURE_GROUP TABLE RECORDS. |
| DOCUMENTID | NUMBER(LONG) | 4 | THE DOCUMENTID FIELD STORES A KEY TO A RECORD IN THE "DOCUMENT" TABLE THAT IDENTIFIES DOCUMENT TEXT THAT MAYBE INCLUDED IN THE GENERATED DOCUMENT WHEN THE PARENT STRUCTURE QUESTION IS SELECTED. |

FIG. 13

| TABLE: | THE "STRUCTURE_QUESTION" TABLE STORES THE CATALOGUE OF STRUCTURE QUESTIONS ENTERED BY A SCRIPT DEVELOPER. A USER | | |
|---|---|---|---|
| STRUCTURE_QUESTION | MAY SUBSEQUENTLY PROVIDE YES/NO (SELECTED/SE-SELECTED) BOOLEAN REPSONSES TO THOSE QUESTIONS THAT ARE PRESENTED TO THE USER. | | |

| FIELD NAME | DATA TYPE | SIZE | COMMENTS |
|---|---|---|---|
| STRUCTQUESID | NUMBER(LONG) | 4 | THE STRUCTQUESID FIELD STORES A VALUE IDENTIFYING THE "STRUCTURE_QUESTION" TABLE RECORD. THE STORED VALUE IS UNIQUE WITHIN THE "STRUCTURE_QUESTION" TABLE. TYPICALLY, RECORDS IN THE "STRUCTURE" TABLE WILL POINT TO RECORDS IN THE "STRUCTURE_QUESTION" TABLE THROUGH USE OF A STORED STRUCTQUESID VALUE. THE NUMBER OF "STRUCTURE_QUESTION" RECORDS MAY BE GREATER THAN THE NUMBER POINTED TO FROM THE "STRUCTURE" TABLE. |
| STRUCLINETITLE | TEXT | 80 | THE STRUCLINETITLE FIELD PROVIDES A SHORTENED TEXT LABEL FOR THE STRUCTURE_QUESTION RECORD. THE SHORTENED LABEL IS DISPLAYED IN THE STRUCTURE BUILDER SCREEN OF THE ADMINISTRATION MODULE AS A SHORT-HAND REPRESENTATION OF THE QUESTION. |
| STRUCQUESTIONTEXT | TEXT | 250 | THE STRUCQUESTIONTEXT FIELD STORES STRUCTURE QUESTION TEXT THAT IS PRESENTED TO A USER, TYPICALLY A YES NO QUESTION. |
| STRUCINSTANCE | YES/NO | 1 | THE STRUCINSTANCE FIELD IDENTIFIES WHETHER MULTIPLE INSTANCES OF THIS STRUCTURE CAN EXIST (THIS IS, WHETHER THERE CAN BE MULTIPLE ITERATION OF THIS STRUCTURE). MULTIPLE INSTANCES CAN BE USED WHERE, FOR EXAMPLE, A QUESTION ASKS FOR A PERSON'S NAME AND THE PARTICULAR TRANSACTION REQUIRES MULTIPLE PARTIES TO BE NAMED. EACH INSTANCE CAN IDENTIFY A SEPARATE PARTY OR A PERMUTATION OF A REPEATING FORM OR DOCUMENT. |

*FIG. 14*

TABLE: STRUCTURE_GROUP

THE "STRUCTURE_GROUP" TABLE DEFINES EXCLUSIVE GROUPS OF STRUCTURE QUESTIONS, THAT IS, ONLY ONE STRUCTURE QUESTION WITHIN A GROUP MAY BE SELECTED AT A GIVEN TIME.

| FIELD NAME | DATA TYPE | SIZE | COMMENTS |
|---|---|---|---|
| GROUPID | NUMBER(LONG) | 4 | THE GROUPID FIELD IDENTIFIES A GROUP OF ASSOCIATED "STRUCTURE_GROUP" RECORDS. THE ASSOCIATED "STRUCTURE_GROUP" RECORDS IDENTIFY "STRUCTURE" TABLE RECORDS THAT ARE MUTUALLY EXCLUSIVE. THAT IS, FOR A GIVEN GROUP OF "STRUCTURE" TABLE RECORDS ASSOCIATED THROUGH THE "STRUCTURE_GROUP" TABLE, ONLY ONE RECORD MAY HAVE A SELECTED REPSONSE ASSOCIATED WITH IT (THAT IS, ONLY ONE MEMBER OF THE GROUP MAY BE CHOSEN BY A USER). |
| STRUCTQUESID | NUMBER(LONG) | 4 | THE STRUCTQUESID FIELD POINTS TO A STRUCTURE TABLE RECORDS THAT IS PART OF A MUTUALLY EXCLUSIVE GROUP HAVING A COMMON GROUPID FIELD VALUE. |

*FIG. 15*

TABLE: RESPONSE

THE "RESPONSE" TABLE RECORDS ANSWERS TO STRUCTURE QUESTIONS IN A PARTICULAR DEAL. EACH ANSWER IS A BOOLEAN (TRUE/FALSE) RESPONSE. RESPONSE RECORDS FORM A INTEGRAL PART OF THE STORED DEAL-SPECIFIC DATA. A USER'S ANSWERS TO STRUCTURE QUESTIONS DETERMINE THE INFORMATION QUESTIONS (IN THE QUESTION TABLE) THAT WILL SUBSEQUENTLY BE PRESENTED TO A USER.

| FIELD NAME | DATA TYPE | SIZE | COMMENTS |
|---|---|---|---|
| DEALKEYID | TEXT | 8 | THE DEALKEYID FIELD VALUE IDENTIFIES A DEAL RECORD DEFINED IN THE DEALKEY TABLE. MULTIPLE RESPONSE RECORD ARE TYPICALLY ASSOCIATED WITH A COMMON DEALKEY TALBE RECORD INDICATING THAT THE MULTIPLE RESPONSE RECORDS ARE PART OF THE SAME DEAL. EACH RECORD ASSOCIATED WITH A PARTICULAR DEAL WILL HAVE THE SAME DEALKEYID. |
| STRUCTQUESID | NUMBER(LONG) | 4 | THE STRUCTQUESID FIELD IDENTIFIES (POINTS TO) A STRUCTURE QUESTION THAT THE RESPONSE RECORD PERTAINS TO. |
| STRUCRESPONSE | YES/NO | 1 | THE STRURESPONSE FIELD STORES THE USER'S RESPONSE TO THE STRUCTURE QUESTION POINTED AT BY STRUCQUESID. THE STRUCRESPONSE FIELD VALUE INDICATES "YES" IF THE POINTED-TO QUESTION WAS SELECTED/CLICKED BY A USER; OTHERWISE, STRUCRESPONSE INDICATES "NO". |
| INSTANCECOUNT | NUMBER(DOUBLE) | 8 | THE INSTANCECOUNT FIELD IDENTIFIES THE NUMBER OF INSTANCES CHOSEN FOR THIS STRUCTURE IN THIS DEAL BY THE USER PERTAINING TO A COMMON STRUCQUESID. |

*FIG. 16*

TABLE: DOCUMENT

EACH RECORD IN THE "DOCUMENT" TABLE IDENTIFIES AN EXTERNALLY STORED TEXT FILE THAT CAN BE INCLUDED AS PART OF A FINAL GENERATED DOCUMENT. TYPICALLY, THE NUMBER OF RECORDS IN THE DOCUMENT TABLE WILL BE GREATER THAN THE NUMBER OF PARTS IN THE FINAL GENERATED DOCUMENT; IT ALSO EXCEEDS THE NUMBER OF EXTERNAL TEXT FILES, AS THE SAME INPUT TEXT MAY BE USED IN MORE THAN ONE SITUATION.

| FIELD NAME | DATA TYPE | SIZE | COMMENTS |
|---|---|---|---|
| DOCUMENTID | NUMBER(LONG) | 4 | THE DOCUMENTID FIELD STORES A UNIQUE VALUE IDENTIFYING THE "DOCUMENT" TABLE RECORD. RECORDS IN THE "DOCUMENT" TABLE IDENTIFYING EXTERNALLY STORED TEXT FILES THAT CAN BE INCLUDED IN THE GENERATED TEXT. |
| DOCLINETITLE | TEXT | 80 | THE DOCLINETITLE FIELD STORES A TEXT LABEL THAT CAN BE USED AS A SHORTENED DESCRIPTION OF THE FILE THAT IS FURTHER DESCRIBED BY TEXT STORED IN THE DOCDESC FIELD. THE DOCLINETITLE DATA CAN BE USED, FOR EXAMPLE, AS A BRIEF DESCRIPTION PRESENTED TO AN ADMINISTRATOR/SCRIPT DEVELOPER IN THE STRUCTURE DISPLAY IN THE ADMINISTRATION MODULE. |
| DOCDESC | TEXT | 250 | THE DOCDESC FIELD PROVIDES A TEXTUAL DESCRIPTION OF THE EXTERNALLY STORED TEXT FILE THAT IS TO BE INCLUDED IN THE GENERATED DOCUMENT. THE DOCDESC FIELD IS USED BY THE ADMINISTRATOR/SCRIPT DEVELOPER, FOR EXAMPLE, TO STORE COMMENTS DESCRIBING THE FUNCTION OF THE EXTERNALLY STORED TEXT FILE. |
| DOCFILENAME | TEXT | 150 | THE DOCFILENAME FIELD STORES THE FILE NAME AND PATH OF AN EXTERNALLY STORED DOCUMENT TEXT SEGMENT FILE. |

*FIG. 17*

TABLE: QUESTION

EACH RECORD IN THE "QUESTION" TABLE CORRESPONDS TO A "FILL-IN-THE-BLANK" TYPE QUESTION (ALSO REFERRED TO AS AN INFORMATION QUESTION) THAT A USER MAY BE ASKED. ANSWERS TO THESE QUESTIONS ARE STORED IN LINKQ TABLE RECORDS THAT ARE ASSOCIATED WITH THE QUESTION TABLE RECORD. FOR EXAMPLE, A QUESTION ASKING FOR AN INDIVIDUAL'S NAME MAY BE STORED IN A QUESTION TABLE RECORD AND A USER'S ANSWER TO THE QUESTION MAY BE STORED IN A LINKQ TABLE RECORD, AND SAVED IN THE RESPONSE TABLE RECORD. MULTIPLE LINKQ TABLE RECORDS MAY BE ASSOCIATED WITH A GIVEN QUESTION TABLE RECORD, EACH OF THE LINKQ RECORDS BEING A SEPARATE INSTANCED RESPONSE TO THE QUESTION RECORD.

| FIELD NAME | DATA TYPE | SIZE | COMMENTS |
|---|---|---|---|
| QUESTIONID | NUMBER(LONG) | 4 | THE QUESTIONID FIELD VALUE UNIQUELY IDENTIFIES THE RECORD IN THE "QUESTION" TABLE. |
| QUESTIONLINETITLE | TEXT | 16 | THE WORDNAME FIELD STORES A MARKER TEXT PATTERN USED WHEN INSERTING RESPONSE ANSWERS (INFORMATION ELEMENT DATA) FROM CORRESPONDING LINKQ RECORDS INTO DOCUMENT TEXT SEGMENTS. THE DOCUMENT TEXT SEGMENTS (IDENTIFIED BY THE DOCFILENAME IN THE DOCUMENT TABLE) INCLUDES IDENTICAL MARKER TEXT PATTERNS WHEREVER RESPONSE ANSWERS ARE TO BE INSERTED. RESPONSE ANSWERS ARE INSERTED BY A SEARCH/REPLACE OPERATION THAT SEARCHES FOR THE MARKER VALUE IDENTIFIED BY THE WORDNAME FIELD AND REPLACES IT WITH THE ANSWER VALUE STORED IN THE RESPONSE FIELD OF A LINKQ RECORD. |
| WORDNAME | TEXT | 50 | THE DEFAULT FIELD STORES A DEFAULT TEXT STRING THAT IS STORED AS A RESPONSE IN A LINKQ RECORD IN THE EVENT THAT A USER DOESN'T OTHERWISE RESPOND TO AN INFORMATION QUESTION. |
| DEFAULT | TEXT | 8 | THE ANSDATATYPE FIELD INDICATES THE TYPE OF DATA EXPECTED IN RESPONSE TO AN INFORMATION QUESTION. THE ANSDATATYPE FIELD VALUE CAN DETERMINE FORMATTING OF THE RESPONSE DATA AND CAN DETERMINE DATA VALIDATION MESSAGES PRESENTED TO A USER IF INPUT DATA DOES NOT CONFORM TO PREDETERMINED VALIDATION CRITERIA. FOR EXAMPLE, VALUES STORED IN THE ANSDATATYPE MAY INDICATED THAT THE EXPECTED RESPONSE IS A NUMERIC VALUE, A STRING VALUE, A CURRENCE VALUE, OR A TEXT CONVERSION FROM ANOTHER NUMERIC ANSWER. FORMATTING INFORMATION MAY ALSO BE STORED. FOR EXAMPLE, THE ANSDATATYPE FIELD MAY INDICATE THAT A NUMERIC VALUE IS TO BE RECEIVED AND THAT THE VALUE REPRESENTS A PERCENTAGE. |
| RANGELOW | NUMBER(DOUBLE) | 8 | THE RANGELOW FIELD VALUE INDICATES THE LOWEST ACCEPTABLE VALUE FOR NUMERIC RESPONSE DATA. |
| RANGEHIGH | NUMBER(DOUBLE) | 8 | THE RANGEHIGH FIELD VALUE INDICATES THE HIGHEST ACCEPTABLE VALUE FOR A NUMERIC RESPONSE DATA. |
| QUESTIONTEXT | TEXT | 250 | THE QUESTIONTEXT FIELD STORES A QUESTION THAT CAN BE PRESENTED TO A USER. |

*FIG. 18A*

TABLE: QUESTION (CONTINUED)

| HELPTEXT | TEXT | 110 | THE HELPTEXT FIELD STORES HELP OR HINT TEXT THAT IS DISPLAYED TO ASSIST THE USER IN RESPONDING TO THE QUESTION. |
|---|---|---|---|
| QUESTIONLINETITLE | TEXT | 80 | THE QUESTIONLINETITLE FIELD STORES A SHORT-CUT TITLE THAT MAY BE DISPLAYED IN THE ADMINISTRATION MODULE TO REFER TO THE RECORD. |
| NOTES | TEXT | 250 | THE NOTES FIELD STORES MISCELLANEOUS ADMINISTRATION NOTES, SUCH AS THE REVISION HISTORY. |
| SINGLEINSTANCE | YES/NO | 1 | THE SINGLEINSTANCE FIELD STORES A FLAG USED BY THE ADMINISTRATOR/SCRIPT DEVELOPER TO INDICATE THAT THE PARTICULAR QUESTION CANNOT BE INSTANCED EVEN THOUGH THE REMAINDER OF THE DOCUMENT MAY INCLUDE INSTANCES. |
| RECORDTYPE | NUMBER(DOUBLE) | 8 | FOR MULTIPLE-CHOICE QUESTION, THE RECORDTYPE FIELD POINTS TO A FIRST ANSWER CHOICE IN THE [MULTIPLE-CHOICE] ANSWER TABLE. |
| PREVQUESID | NUMBER(DOUBLE) | 8 | THE PREVQUESID FIELD IDENTIFIES A PREVIOUS QUESTION TABLE RECORD HAVING AN QUESTIONID VALUE THAT MATCHES THIS FIELDS PREVQUESID VALUE. THE PREVIOUS QUESTION'S RESPONSE IS SUPPLIED AS A "SMART DEFAULT" TO THE CURRENT QUESTION RECORD. THIS ALLOWS THE ANSWER TO A PREVIOUS QUESTION TO BE USED AS A DEFAULT RESPONSE TO A SUBSEQUENT QUESTION. |
| VISIBILITY | YES/NO | 1 | THE VISIBILITY FIELD INDICATES THAT THE CURRENT QUESTION TABLE RECORD IS TO BE SUPPRESSED (THAT IS, IT IS NOT TO BE DISPLAYED TO A USER). |
| PREFIX | TEXT | 240 | THE PREFIX FIELD STORES MANDATORY PREFIX TEXT. THE MANDATORY PREFIX TEXT CAN BE PREPENDED TO A RESPONSE RECEIVED FROM A USER, AND COMPRISES PART OF THE ANSWER. |
| SUFFIX | TEXT | 240 | THE SUFFIX FIELD STORES MANDATORY SUFFIX TEXT. THE MANDATORY SUFFIX TEXT CAN BE APPENDED TO A RESPONSE RECEIVED FROM A USER, AND COMPRISES PART OF THE ANSWER. |

*FIG. 18B*

TABLE: ANSWER

EACH RECORD IN THE "ANSWER" TABLE STORES A SINGLE RESPONSE CHOICE FOR A MULTIPLE-CHOICE QUESTION. IF ANY MULTIPLE CHOICE QUESTIONS ARE USED, THE "ANSWER" TABLE WILL INCLUDE MULTIPLE RELATED RECORDS CORRESPONDING TO A COMMON QUESTION ID IN THE "QUESTION" TABLE, EACH RECORD DEFINING A POTENTIAL RESPONSE TO THE MULTIPLE-CHOICE QUESTION.

| FIELD NAME | DATA TYPE | SIZE | COMMENTS |
|---|---|---|---|
| QUESTIONID | NUMBER(LONG) | 4 | THE QUESTIONID FIELD IDENTIFIES A CORRESPONDING RECORD IN THE QUESTION TABLE HAVING THE SAME QUESTIONID VALUE. MULTIPLE RECORDS IN THE "ANSWER" TABLE CAN HAVE THE SAME QUESTIONID INDICATING THAT THEY PERTAIN TO THE SAME QUESTION RECORD IN THE QUESTION TABLE. |
| SEQ_NO | NUMBER(LONG) | 4 | THE SEQ_NO FIELD CONTROLS THE SEQUENCE IN WHICH ANSWERS DEFINED BY A COLLECTION OF "ANSWER" TABLE RECORDS ARE PRESENTED. RECORDS HAVING A LOWER SEQ_NO VALUE ARE PRESENTED BEFORE HIGHER SEQ_NO VALUE RECORDS. |
| ANSWERTEXT | TEXT | 250 | THE ANSWERTEXT FIELD STORES ANSWER TEXT CORRESPONDING TO A MULTIPLE-CHOICE RESPONSE THAT MAY BE SELECTED BY A USER. |

FIG. 19

TABLE: DOC_TO_QUESTION

RECORDS IN THE "DOC_TO_QUESTION" TABLE ESTABLISH A LINKAGE BETWEEN A RECORD IN THE "QUESTION" TABLE AND A RECORD IN THE "DOCUMENT" TABLE. EACH RECORD IN THE "QUESTION" TABLE DEFINES A "FILL-IN-THE-BLANK" OR INFORMATION QUESTION TO BE ASKED OF A USER. THE COLLECTION OF "FILL-IN-THE-BLANK" QUESTIONS TO BE PRESENTED TO A USER IS DETERMINED BY THE USER'S SELECTION OF DOCUMENT STRUCTURE ELEMENTS (I.E., THE USER'S STRUCTURE QUESTION RESPONSE).

| FIELD NAME | DATA TYPE | SIZE | COMMENTS |
|---|---|---|---|
| DOCUMENTID | NUMBER(LONG) | 4 | THE DOCUMENT ID FIELD STORES A POINTER VALUE IDENTIFYING A RECORD IN THE "DOCUMENT" TABLE WITH A CORRESPONDING DOCUMENTID VALUE. |
| QUESTIONLINENUM | NUMBER(LONG) | 4 | THE QUESTIONLINENUM FIELD STORES A SEQUENCE NUMBER THAT MAINTAINS THE ORDER IN WHICH QUESTIONS IN THE "QUESTION" TABLE ARE PRESENTED TO A USER. |
| QUESTIONID | NUMBER(LONG) | 4 | THE QUESTIONID FIELD IDENTIFIES A RECORD IN THE "QUESTION" TABLE THAT IS TO BE PRESENTED TO A USER IN THE ORDER DEFINED BY THE QUESTIONLINENUM VALUE. |

FIG. 20

TABLE: LINKQ

EACH RECORD STORED IN THE "LINKQ" TABLE CAN BE USED TO STORE A USER'S INITIAL RESPONSE TO A INFORMATION QUESTION FORM A CORRESPONDING [INFORMATION] QUESTION TABLE RECORD. THE RECIEVED ANSWERS MAYBE SUBSEQUENTLY SAVE IN THE "TRANSACTION" TABLE.

| FIELD NAME | DATA TYPE | SIZE | COMMENTS |
|---|---|---|---|
| QUESTIONID | NUMBER(LONG) | 4 | THE QUESTIONID FIELD IDENTIFIES A RELATED RECORD IN THE "QUESTION" TABLE HAVING A CORRESPONDING QUESTIONID VALUE. |
| DOCUMENTID | NUMBER(LONG) | 4 | THE DOCUMENTID FIELD IDENTIFIES A RELATED RECORD IN THE "DOCUMENT" TABLE HAVING A CORRESPONDING DOCUMENTID VALUE, WITH WHICH THE QUESTION IDENTIFIED BY QUESTIONID IS ASSOCIATED. |
| INSTANCE | NUMBER(DOUBLE) | 8 | FOR QUESTIONS SUPPORTING MULTIPLE INSTANCES, THE INSTANCE FIELD STORES A COUNTER UNIQUELY IDENTIFYING THE PARTICULAR INSTANCE THAT A PARTICULAR RESPONSE PERTAINS TO. |
| QUESTIONLINENUM | NUMBER(LONG) | 4 | THE QUESTIONLINENUM FIELD INDENTIFIES A RECORD IN THE "OUTPUT TABLE" WITH A CORRESPONDING QUESTIONLINENUM. |
| RESPONSE | TEXT | 250 | THE RESPONSE FIELD STORES AN USER'S ANSWER TO AN INFORMATION QUESTION IDENFIED BY THE QUESTIONID FIELD VALUE. |
| ANSWERFLAG | YES/NO | 1 | THE ANSWERFLAG FIELD INDICATES WHETHER THE RESPONSE FIELD CONTAINES A DEFAULT RESPONSE OR A USER-INPUT RESPONSE VALUE. |

FIG. 21

TABLE: DEALKEY

EACH RECORD IN THE "DEALKEY" TABLE IDENTIFIES A SEPERATE DEAL OR TRANSACTION. THAT IS, A "DEALKEY" RECORD FORMS THE BASE OF A TREE-LIKE STRUCTURE USED TO INTERCONNECT VARIOUS TABLE RECORDS CORRESPONDING TO A DEFINED DEAL, ESPECIALLY WHEN IT IS SAVED.

| FIELD NAME | DATA TYPE | SIZE | COMMENTS |
|---|---|---|---|
| DEALKEYID | TEXT | 8 | THE DEALKEYID FIELD STORES A LABEL ASSIGNED BY A USER TO UNIQUELY IDENTIFY A PARTICULAR TRANSACTION. |
| OUTFILENAME | TEXT | 150 | THE OUTFILENAME FIELD STORES AN OUTPUT FILE PATH AND NAME INDICATING WHERE A GENERATED DOCUMENT IS TO BE STORED. |
| EFFDATE | DATE/TIME | 8 | THE EFFDATE FIELD STORES A CURRENT DATE/TIME INFORMATION. |
| DEALDESC | TEXT | 250 | THE DEALDESC FIELD STORES A USER-DEFINED TEXT DESCRIPTION OF THE TRANSACTION. |
| CREATEDATE | DATE/TIME | 8 | THE CREATEDATE FIELD STORES THE DATA ON WHICH INITIAL ENTRY OF THE DEAL DATA COMMENCED. |
| LASTUPDATE | DATE/TIME | 8 | THE LASTUPDATE FIELD IDENTIFIES THE LAST TIME ANY DEAL DATA WAS REVISED. |
| PREPAREDBY | TEXT | 30 | THE PREPAREDBY FIELD IDENTIFIES THE ORIGINATOR OF THE TRANSACTION. THE VALUE CORRESPONDS TO A LOGIN IDNETIFIER. |
| MODBY | TEXT | 30 | THE MODBY FIELD IDENTIFIES THE LAST INDIVIDUAL TO MODIFY TRANSACTION DATA. THE VALUE CORRESPONDS TO A LOGIN IDENTIFIER. |

FIG. 22

TABLE: CLONETBL

EACH RECORD IN THE "CLONETBL" TABLE REPRESENTS AN INFORMATION QUESTION TO BE DUPLICATED WHEN THE ADMINISTRATOR/SCRIPT DEVELOPER ELECTS THE STRUCTURE CLONING FUNCTION. READ IN CONJUNCTION WITH THE STRUCTURE-RELATED INFORMATION, THE ENTIRE STRUCTURE OF THE CLONED SUBSTRUCTURE CAN BE IDENTIFIED. THIS IS A TEMPORARY TALBE, WHICH IS CLEARED WHEN THE CLONING IS DONE.

| FIELD NAME | DATA TYPE | SIZE | COMMENTS |
|---|---|---|---|
| STRUCLINENUM | NUMBER(LONG) | 4 | THE STRUCLINENUMB FIELD CONTROLS SEQUENCES WITHIN THIS TALBE, FOLLOWING THE SEQUENCING IN THE STRUCTURE TABLE FIELD OF THE SAME NAME. |
| INDENT | NUMBER(LONG) | 4 | THE INDENT FIELD CONTROLS STRUCTURE LEVEL WITHIN THIS TABLE, FOLLOWING THE SEQUENCING IN THE STRUCTURE TALBE FIELD OF THE SAME NAME. |
| OLDSID | NUMBER(LONG) | 4 | THE OLDSID FIELD RECORDS THE OLD STRUCTUREID NUMBER, THE ORIGINAL FROM WHICH THE CLONE IS MADE. |
| OLDDID | NUMBER(LONG) | 4 | THE OLDDID FIELD RECORDS THE OLD DOCUMENTID NUMBER, THE ORIGINAL FROM WHICH THE CLONE IS MADE. |
| NEWSID | NUMBER(LONG) | 4 | THE NEWSID FIELD RECORDS THE NEW STRUCTUREID NUMBER, THE NEW STRUCTURE CREATED BY THE CLONING. |
| NEWDID | NUMBER(LONG) | 4 | THE NEWDID FIELD RECORDS THE NEW DOCUMENTID NUMBER, THE NEW RECORD CREATED BY THE CLONING. |
| QUESTIONID | NUMBER(LONG) | 4 | RECORDS THE OLD INFORMATION QUESTION ID NUMBER, WHICH IS THEN REPLACED WITH THE NEW INFORMATION QUESTION ID NUMBER, AS THE CLONING PORCESS PROCEEDS. |

FIG. 23

TABLE: EACH RECORD IN THE "DATABASE_DEFINITION" TABLE CONTAINS KEY DATABASE PARAMETERS FROM WHICH CORRUPT OR
DATABASE_DEFINITION DEFECTIVE INDEXES OR TABLE ORGANIZATION CAN BE RE-ESTABLISHED THROUGH THE REPAIR PROCESS INVOKED AT THE
ADMINISTRATION MODULE.

| TABLEINDEX | NUMBER(LONG) | 4 | SEQUENCE NUMBER TO CONTROL PROCESSING STEPS DURING THE REPAIR |
| --- | --- | --- | --- |
| TABLENAME | TEXT | 100 | LISTS THE FULL NAME OF EACH TABLE IN THE DATABASE. |
| PRIMARYKEYS | TEXT | 240 | LIST OF FIELDS IN THE INDICATED TABLE WHICH COMPRISE THE PRIMARY KEY, IN ORDER. |
| ALLOWZEROLENGTH | TEXT | 240 | LIST OF FIELDS IN THE INDICATED TABLE FOR WHICH ZERO LENGTH ENTRIES ARE ALLOWED. |
| DEFAULTVALUE | TEXT | 240 | LIST OF FIELDS IN THE INDICATED TABLE WHICH ARE MARKED WITH DEFAULT VALUE. |
| REQUIRED | TEXT | 240 | LIST OF FIELDS IN THE INDICATED TABLE WHICH ARE MARKED REQUIRED. |

*FIG. 24*

| TABLE: | THE "EXPLIMP" TABLE CONTROLS IMPORT OF STRUCTURE CHANGE FILES, SUPPLIED EXTERNALLY BY THE ADMINISTRATOR/SCRIPT DEVELOPER |
| --- | --- |
| EXPLIMP | TO UPDATE THIS DATABASE, AND TO CONTROL EXPORT OF DEALS FROM USER MODULE TO PROCESSOR MODULE, SO THAT A DOCUMENT CAN BE GENERATED. THIS TABLE ALSO CONTROLS IMPORT OF THOSE PREVIOUSLY EXPORTED DEALS INTO THE PROCESSOR MODULE. |

| FIELD NAME | DATA TYPE | SIZE | COMMENTS |
| --- | --- | --- | --- |
| LAST ADMIN EXPORT DATE | DATE/TIME | 8 | RECORDS THE DATE A STRUCTURE CHANGE FILE WAS EXPORTED BY THE ADMINISTRATOR/SCRIPT DEVELOPER. |
| LAST ADMIN IMPORT DATE | DATE/TIME | 8 | RECORDS THE DATE THE LAST STRUCTURE CHANGE FILE WAS APPLIED TO THIS DATABASE |
| LAST ADMIN MOD DATE | DATE/TIME | 8 | RECORDS THE CREATION DATE OF THE LATEST STRUCTURE CHANGE FILE APPLIED TO THIS DATABASE. |
| LAST USER EXPORT DATE | DATE/TIME | 8 | RECORDS THE DATE THAT AN DEAL OR GROUP OF DEALS WAS EXPORTED. |
| LAST USER IMPORT DATE | DATE/TIME | 8 | RECORDS THE DATE THAT A DEAL OR GROUP DEALS WAS IMPORTED. |
| LASST USER MOD DATE | DATE/TIME | 8 | RECORDS THE MOST RECENT MODIFICATION DATE FOR EACH DEAL, MATCHING THE DEALID TABLE'S LASTUPDATE FOR THAT DEAL. |
| COMMENTS | TEXT | 240 | COMMENTS FROM THE USER, FOR DEAL EXPORTS, OR THE ADMINISTRATOR/SCRIPT DEVELOPER, FOR STRUCTURE CHANGES. |
| DBTYPE | TEXT | 50 | COMPATIBILITY DESCRIPTION, TO MATCH VERSIONS OF DEAL GENERATOR. |
| VERSION | TEXT | 50 | COMPATIBILITY INFORMATION, TO AVOID IMPORTATION OF ACCESS95 OR ACCESS97 FILES. |

*FIG. 25*

TABLE: INPUT_TABLE

THE "INPUT_TABLE" IS A TEMPORARY TABLE THAT MAY BE USED TO ENHANCE PERFORMANCE. SUCH A TABLE MAY BE DYNAMICALLY CREATED TO MANAGE INPUT AND DISPLAY DURING THE OPERATION OF THE DEAL GENERATOR. PERFORMANCE ENHANCEMENT MAY BE PROVIDED BY STORING ONLY THOSE INFORMATION QUESTION TABLE RECORDS CORRESPONDING TO A PARTICULAR TRANSACTION.

| FIELD NAME | DATA TYPE | SIZE | COMMENTS |
|---|---|---|---|
| QUESTIONLINENUM | NUMBER(LONG) | 4 | KEY TO A RECORD IN THE DOC_TO_QUESTION TABLE HAVING A CORRESPONDING QUESTIONLINENUM VALUE. |
| QUESTIONID | NUMBER(LONG) | 4 | KEY TO A RECORD IN THE [INFORMATION] QUESTION TABLE HAVING A CORRESPONDING QUESTIONID VALUE. |
| QUESTIONTEXT | TEXT | 250 | THIS FIELD STORES A COPY OF A CORRESPONDING VALUE FROM A CORRESPONDING FIELD IN A QUESTION TABLE RECORD IDENTIFIED BY THE QUESTIONID VALUE. |
| DEAFAULT | TEXT | 50 | THIS FIELD STORES A COPY OF A CORRESPONDING VALUE FROM A CORRESPONDING FIELD IN A QUESTION TABLE RECORD IDENTIFIED BY THE QUESTIONID VALUE. |
| ANSDATATYPE | TEXT | 50 | THIS FIELD STORES A COPY OF A CORRESPONDING VALUE FROM A CORRESPONDING FIELD IN A QUESTION TABLE RECORD IDENTIFIED BY TEH QUESTIONID VALUE. |
| RANGELOW | NUMBER(DOUBLE) | 8 | THIS FIELD STORES A COPY OF A CORRESPONDING VALUE FROM A CORRESPONDING FIELD IN A QUESTION TABLE RECORD IDENTIFIED BY TEH QUESTIONID VALUE. |
| RANGEHIGH | NUMBER(DOUBLE) | 8 | THIS FIELD STORES A COPY OF A CORRESPONDING VALUE FROM A CORRESPONDING FIELD IN A QUESTION TABLE RECORD IDENTIFIED BY TEH QUESTIONID VALUE. |
| HELPTEXT | TEXT | 110 | THIS FIELD STORES A COPY OF A CORRESPONDING VALUE FROM A CORRESPONDING FIELD IN A QUESTION TABLE RECORD IDENTIFIED BY TEH QUESTIONID VALUE. |
| PREVQUESID | NUMBER(DOUBLE) | 8 | THIS FIELD STORES A COPY OF A CORRESPONDING VALUE FROM A CORRESPONDING FIELD IN A QUESTION TABLE RECORD IDENTIFIED BY TEH QUESTIONID VALUE. |

*FIG. 26*

TABLE: MACRO_ID

THE DOCUMENT GENERATOR ALLOWS WORD PROCESSING MACROS TO BE EXECUTED WHEN THE DOCUMENT STRUCTURE SEGMENTS ARE ASSEMBLED BUT BEFORE INSERTION OF LINKQ RESPONSE FIELD VALUES OR AFTER BOTH SEGMENT ASSEMBLY AND INSERTION OF LINKQ TABLE RESPONSE FIELD VALUES.

| FIELD NAME | DATA TYPE | SIZE | COMMENTS |
|---|---|---|---|
| STRUCQUESID | NUMBER(LONG) | 4 | KEY TO AN UNINDENTED, I.E. TOP LEVEL, RECORD IN THE "STRUCTUREq" TABLE. |
| PRE DOC NAME | TEXT | 15 | STORES THE NAME OF A FIRST DOCUMENT OR TEMPLATE INTO WHICH OTHER DOCUMENT SECTIONS ARE APPENDED OR INSERTED, AND IN WHICH THE MACROS NAMED BELOW ARE STORED. |
| POST DOC NAME | TEXT | 15 | STORES THE NAME OF A FINAL PAGE THAT IS APPENDED TO A GENERATED DOCUMENT. |
| PRE MACRO NAME | TEXT | 32 | NAMES A MACRO IN THE TEMPLATE IDENTIFIED BY A PRE_DOC_NAME THAT IS EXECUTED BEFORE THE VARIOUS DOCUMENT STRUCTURE SEGMENTS ARE APPENDED TOGETHER. |
| POST MACRO NAME | TEXT | 32 | NAMES A MACRO IN THE TEMPLATE IDENTIFIED BY PRE_DOC_NAME THAT IS EXECUTED AFTER INSERTION OF ALL RESPONSES INTO THE ASSEMBLED DOCUMENT. |

FIG. 27

| TABLE: | THIS TEMPORARY TABLE ENHANCES PERFORMANCE, FOR DISPLAY, PRINTOUT AND FINAL DOCUMENT GENERATION. EACH RECORD OF THE |
|---|---|
| OUTPUT_TABLE | OUTPUT_TABLE CORRESPONDS TO A SELECTED RECORD IN THE QUESTION TABLE. THE OUTPUT_TABLE I A SUBSET OF QUESTION TABLE RECORDS CORRESPONDING TO THOSE QUESTION TABLE RECORDS THAT ARE RELEVANT TO THE PARTICULAR DEAL STRUCTURE. |

| FIELD NAME | DATA TYPE | SIZE | COMMENTS |
|---|---|---|---|
| QUESTIONLINENUM | NUMBER(LONG) | 4 | CONTROLS SEQUENCE OF OPERATIONS, ESPECIALLY THE DISPLAY OF QUESTIONS TO THE USER AND THE PRINTOUTS OF THE LIST OF QUESTIONS AND ANSWERS AND THE LIST OF UNANSWERED QUESTIONS. |
| QUESTIONID | NUMBER(LONG) | 4 | KEY IDENTIFYING A RECORD IN THE QUESTION TABLE HAVING A CORRESPONDING QUESTIONID VALUE. |
| QUESTIONTEXT | TEXT | 250 | THIS FIELD VALUE IS COPIED FROM THE RECORD IN THE QUESTION TABLE IDENTIFIED BY THE QUESTIONID FIELD VALUE. |
| DEAFAULT | TEXT | 50 | THIS FIELD VALUE IS COPIED FROM THE RECORD IN THE QUESTION TABLE IDENTIFIED BY THE QUESTIONID FIELD VALUE. |
| HELPTEXT | TEXT | 110 | THIS FIELD VALUE IS COPIED FROM THE RECORD IN THE QUESTION TABLE IDENTIFIED BY THE QUESTIONID FIELD VALUE. |
| ANSDATATYPE | TEXT | 8 | THIS FIELD VALUE IS COPIED FROM THE RECORD IN THE QUESTION TABLE IDENTIFIED BY THE QUESTIONID FIELD VALUE. |
| RANGEHIGH | NUMBER(DOUBLE) | 8 | THIS FIELD VALUE IS COPIED FROM THE RECORD IN THE QUESTION TABLE IDENTIFIED BY THE QUESTIONID FIELD VALUE. |
| RANGELOW | NUMBER(DOUBLE) | 8 | THIS FIELD VALUE IS COPIED FROM THE RECORD IN THE QUESTION TABLE IDENTIFIED BY THE QUESTIONID FIELD VALUE. |
| PREVQUESID | NUMBER(LONG) | 4 | THIS FIELD VALUE IS COPIED FROM THE RECORD IN THE QUESTION TABLE IDENTIFIED BY THE QUESTIONID FIELD VALUE. |

FIG. 28

TABLE: TRANSACTION
THE TRANSACTION TABLE STORES THE ANSWERS PROVIDED BY THE USER RESPONDING TO INFORMATION QUESTIONS, WHEN THE DEAL IS SAVED OR IMPORTED.

| FIELD NAME | DATA TYPE | SIZE | COMMENTS |
|---|---|---|---|
| DEALKEYID | TEXT | 8 | STORES AN IDENTIFIER UNIQUELY IDENTIFYING A PARTICULAR TRANSACTION. |
| QUESTIONID | NUMBER(LONG) | 4 | POINTS TO A RECORD IN THE [INFORMATION] "QUESTION" TABALE. |
| RESPONSE | TEXT | 250 | STORES A RESPONSE RECEIVED FROM A USER. |
| INSTANCE | NUMBER(DOUBLE) | 8 | IF THE DOCUMENT IS INSTANCE, INDICATES WHICH INSTANCE THIS ANSWER REPRESENTS. |
| ANSWERFLAG | YES/NO | 1 | TRACKS WHETHER THE ANSWER IS A "DEFAULT" ANSWER OR IF IT WAS OTHERWISE PROVIDED BY THE USER. |

FIG. 29

DOCUMENT GENERATOR

BACKGROUND INFORMATION

This invention relates to computer-based systems for document generation.

Computer software applications are commonly used for text editing and document production. One category of applications, represented by word processing and text editing software, assists a user with the input and editing of text-based documentation. Typically, word processing applications provide a blank entry form in which document text is entered and edited. Alternatively, word processing applications allow previously completed documents or document templates to be retrieved and re-edited to form new documents.

Word processing applications are commonly used to edit and produce documentation required in business transactions. Complex business deals, such as commercial financing and real estate transactions, can require hundreds of pages of documentation specifying rights and obligations of parties to the transaction. The expertise needed to determining the terms of such transactions and to correctly generate and edit the complex documentation accompanying such transactions can require a significant commitment of personnel, time, and cost. Consequently, an automated document production is desirable to reduce costs, delays, and personnel involvement in the document production process.

SUMMARY

The present invention includes a document generation system that can collect information describing a transaction and assist in the generation of transaction-specific documentation. The invention can be used to generate documentation that reflects terms of a negotiated transaction. For example, a loan agent can interact with a loan applicant to negotiate terms of a loan. Information describing the loan terms and the nature of the negotiated deal can be provided to the document generation system. The loan agent may also indicate which standard documents and which clauses within those documents are required for the transaction. A collection of documents may then be generated by the generation system. Further editing of the produced documentation may be performed using conventional word processing and text editing tools.

In general, in one aspect, the invention features a computer-based method of producing a customized package of interrelated documents. The method includes user interaction to identify a collection of available modifiable text segments and user interaction to identify customization data. The identified text segments are used to form the package of interrelated documents and the customization data can be used to complete the identified text segments. The customized package of interrelated documents is automatically assembling based on the identified collection and customization data.

Implementations of the invention may include one or more of the following features. A knowledge base can be used to automatically assemble the documents. The knowledge base can include data associating the modifiable text segments with document structure questions, and data interrelating document structure questions. Identifying the collection of available modifiable text segments can include presenting document structure questions in accordance with the knowledge base, receiving data from a user in response to the presented questions and including as members of the collection the text segments that are associated with the received data. The knowledge base may include data associating the available modifiable text segments with information element questions. Identifying customization data may include presenting information element questions in accordance with the knowledge base and receiving customization data from the user.

In general, in another aspect, the invention features a computer-based method of producing a customized package of interrelated documents. The method includes the following. Identifying a collection of information element questions that will be used to request information element data from a user. Interacting with a user to identify associations being between the collection of information element questions and a collection of available modifiable text segments. Interacting with a user to identifying a collection of document structure questions that will be used to request document structure data from a user, and identifying associations between the collection of document structure questions and ones of the collection of available modifiable text segments.

Implementations of the invention may include one or more of the following features. Data representing associations may be stored in a knowledge base. Modifications to associations may be identified and stored. Identifying a collection of information element questions can include receiving information element question data from the user. Modifiable text segments may be received from a user and stored as members of the collection of available modifiable text segments.

In general, in another aspect, the invention features a computer-based method of producing a customized interrelated collection of documents from a body of available document text segments. The method includes displaying selectable document structure elements. Each structure element is associated with information content of the collection of documents. Response data selecting document structure elements can be received. The method also includes displaying document information element requests and receiving information element data from a user. Information elements may be associated with document structure elements. The method also includes identifying a collection of document text segments by traversing a knowledge representation structure and assembling the text segments to produce a customized collection of interrelated document text segments by including the received information element data at predetermined locations in the collection of the document text segments. The knowledge representation structure associates the collection of document text segments with the selected document structure elements. Assembling the text segments is in response to the selected plurality of documents structure elements.

Implementations of the invention may include one or more of the following features. Selection of a first one of the document structure elements may cause the display of a second selectable document structure element. The second selectable document structure element may be displayed subordinate to the first document structure element. Displaying the second element may include displaying at an indented position relative to the first element. The document structure elements may include a first group of structure elements. Selection of a member of the first group may inhibits selection of remaining members of the group. Information element data may include a text string used to replace a text pattern stored in a document text segment.

Implementations may also include one or more of the following features. Document structure elements may be arranged in a sequential listing Traversing a knowledge representation structure may include processing structure elements according to their position in the sequential listing. Document structure elements may include parent structure elements and child structure elements that are logically subordinate to associated parent structure elements. When a parent structure elements is selected, display of its child structure elements may be enabled and when the parent structure elements is not selected, display of the child structure elements may be inhibited.

In general, in another aspect, the invention features a computer-based method of interrelating document text segments. The method includes providing a question editor interface to receive document structure questions and storing the received questions in database records. Additional, an interface to receive interrelationship data is provided and the received interrelationship data is stored in database records. The interrelationship data defines interrelationships among selected document structure questions and defines associations between selected document structure questions and selected document text segments. An interface can be provided to receive information element associations. Each information element association defines a data item to be received from a user and designates a document text segments associated with the data item to be received. The information element associations can be stored in database records.

Implementations of the invention may include one or more of the following features. Each document structure question may include a text string. Interrelationship data may be stored as structure records in a database. Each structure record may include pointer data to a question record. Selected ones of the structure records may also include pointer data to other structure records. Database records storing the received structure questions may be stored in a first database and database records storing the interrelationship data may be stored in a second database that is separate from the first database.

In general, in another aspect, the invention features a computer-based apparatus for generating documentation. The apparatus includes means for identifying a collection of available modifiable text segments. The identified text segments can be used to form a package of customized interrelated documents. The apparatus also includes means for identifying customization data needed to complete the modifiable text segments, and means for automatically assembling the customized package of interrelated documents based on the identified collection and customization data.

In general, in another aspect, the invention features a computer based apparatus for generating documentation. The apparatus includes means for identifying a collection of information element questions. The information element questions can be used to request information element data from a user. The apparatus also includes means for identifying associations between the collection of information element questions and a collection of available modifiable text segments and means for identifying a collection of document structure questions. The document structure questions are used to request document structure data from a user. Additionally, the apparatus has means for identifying associations between the collection of document structure questions and the collection of available modifiable text segments.

In general, in another aspect, the invention features a computer program residing on a computer-readable medium. The program includes instructions for causing a computer to interact with a user to identifying a collection of available modifiable text segments, and to interact with the user to identify customization data needed to complete the modifiable text segments. Additionally, the program includes instructions to automatically assemble the customized package of interrelated documents based on the identified collection and the customization data.

In general, in another aspect, the invention features a computer program residing on a computer-readable medium. The program includes instructions for causing a computer to interact with a user to identify a collection of information element questions. The information element questions can be used to request information element data from a user. Additionally the program can cause the computer to interact with a user to identify associations being between the collection of information element questions and a collection of available modifiable text segments. The program can also cause the computer to interact with a user to identify a collection of document structure questions that will be used to request document structure data from a user and interact with a user to identify associations between the collection of document structure questions and the collection of available modifiable text segments. The program may store associations in a database.

Implementations of the invention may include one or more of the following advantages. Output documentation may be altered by changing interrelationships between elements in a knowledge base and re-generating the output document. This allows new documentation to be produced from previously input data. Document generation security can be provided through the separation of data entry from data processing and document production. Control of document production through the use of document scripts and the centralized administration of those scripts can help to control and standardize terms specified in the produced documentation. Document scripts form an alterable knowledge base. Document scripts may be altered and applied to previously stored transaction data to produce updated transaction documentation or document variants.

Other advantages and features will become apparent from the following description and from the claims.

DESCRIPTION OF DRAWINGS

FIGS. 2–10 are screen displays for a document generation system.

FIGS. 13–29 depict database tables and table fields that may be used in an implementation of a document generation system.

DETAILED DESCRIPTION

Figure 1:
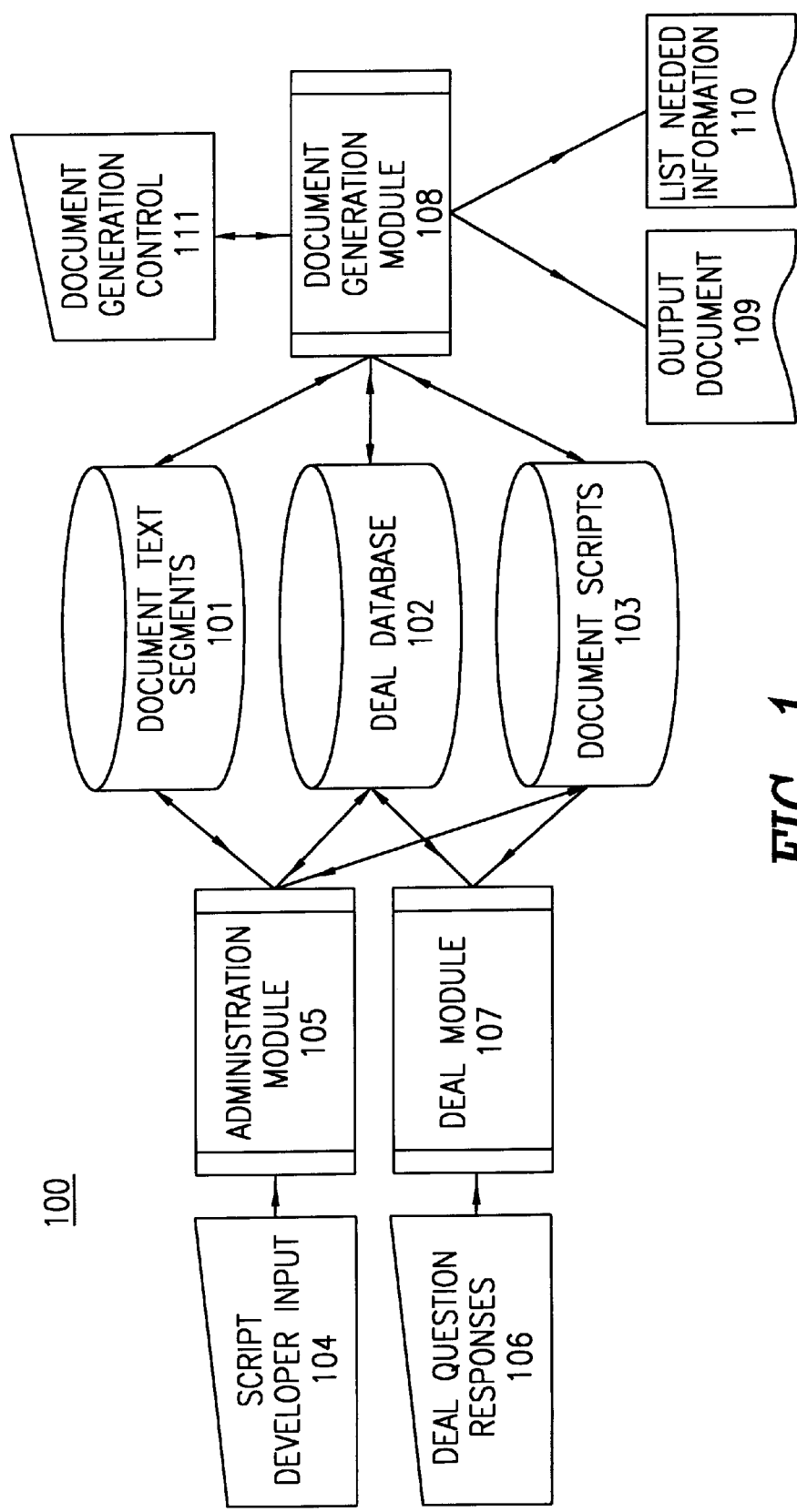
FIG. 1 illustrates a document generation system.

An automated document generation system can be used to produce complex documentation required for commercial and legal transactions. Referring to FIG. 1, a document generation system is illustrated. The document generation system 100 automates the production of complex customized documentation by assembling an output document 109 from selected text segments stored in a database 102. The selected text segments forming the output document 109 are chosen based on a user's input 106 to a series of questions and are assembled in accordance with a stored knowledge base.

In the system 100, document generation is automated through the use of a document script. A document script is a knowledge base component modeling an output document. Document scripts can includes elements defining a series of user input questions, the structure of the output document, and text to be included in the generated output document. The system 100 provides an administrative module 105 that a script developer can use to enter a new script in the system 100 or to edit an existing script. The document script specifies mandatory and optional document text segments, criteria for selecting optional text segments and information needed to complete the generation of the output document 109.

To enter or edit a script, the script developer provides input data 104 to an administration module 105. The administration module 105 includes tools to define and store script elements. Script elements include, among other things, document structure elements, information questions, and document text segments. Document structure elements organize and interrelate document text segments and are used to determine the text segments included in a generated output document 109. As described below, each document structure element can be associated with a structure question, structure response data, and a document text segment. Document text segments may, in turn, be associated with one or more information questions.

At the deal input module 107, structure questions are presented to a user and structure response data is received from the user in response to script processing. Structure questions query the user about specific characteristics of a deal or transaction. In response to a structure question, the user can provide structure response data 106 indicating whether the described characteristic is pertinent to the deal or transaction being contemplated. In a graphical user interface (GUI) implementation, the user may indicate the presence of a particular characteristic by pointing to and clicking on a check box to select or deselect the characteristic. Pointing to and selecting particular characteristics may be done using a computer selection device such as a "mouse". Alternatively, selecting and deselecting may be performed using another input device, such as a keyboard.

Implementations may support hierarchical arrangements of structure questions. In a hierarchical arrangement, structure questions are arranged in parent-child relationships. To facilitate data input by a user, the deal input module 107 may inhibit the display of a child question if its parent question is not selected. Parent-child question hierarchies will be discussed in greater detail below. Structure questions may be interrelated in other ways. For example, structure questions may be organized in mutually exclusive groups. Mutually exclusive groups are organized such that only one group member may be selected at a given time.

Typically, each structure element will be associated with a document text segment. A document text segment defines text that is included in the generated documents 109 when its associated structure element has been selected by the user. A document text segment can, in turn, be associated with one or more information questions. An information question identifies information element data needed to complete the document text segment. For example, a document text segment may include text detailing obligations of a licensee. The document text segment may require the name of the licensee (an information element data item) to be inserted in the text segment during the generation of the output document 109. The deal input module 107 can present information questions to a user and, in response, can receive the required information element data item for later insertion in the output document 109. Information element data may be common to more than one document text segment. That is, multiple text segments in the text segment database 102 may require the same information element data to be inserted in the text segment during output document 109 generation. To simplify user input, the deal input module 107 can be configured to generate only a single request for such an information element. Alternatively, the document script may indicate that the information element data should remain distinct for each text segment and that a separate instance of the information question should be presented to the user for each separate document text segment requiring the information element.

The deal input module 107 may allow a user to respond to a subset of information questions. This is useful where, for example, the user does not know how to respond to each question in a list of information questions presented. The system 100 can track the list of information questions that have not been responded to and thereby determine a list of missing information element data items. Implementations may also support default response values for particular structure questions or information elements. The document generation module 108 can process script information and the full or partial data to produce an output document 109. If the set of information question responses is incomplete, the document generator 108 can produce a list of information element data items 110 that are missing or that are in their default state. The missing data element list 110 can help identify additional document 109 editing that may be required or additional input data 106 that is needed.

The document generation system 100 may be implemented in software on a computer supporting a graphical user interface (GUI). For example, a personal computer supporting the Microsoft Windows NT 4.0® or Microsoft Windows 95® operating system may be used. FIGS. 2–5 illustrate data input and display screens provided in an exemplary Windows 95 implementation of the administration module 105. FIGS. 6–9 illustrate data input and display screens provided in an exemplary Windows 95 implementation of the deal input module 107.

Figure 2:
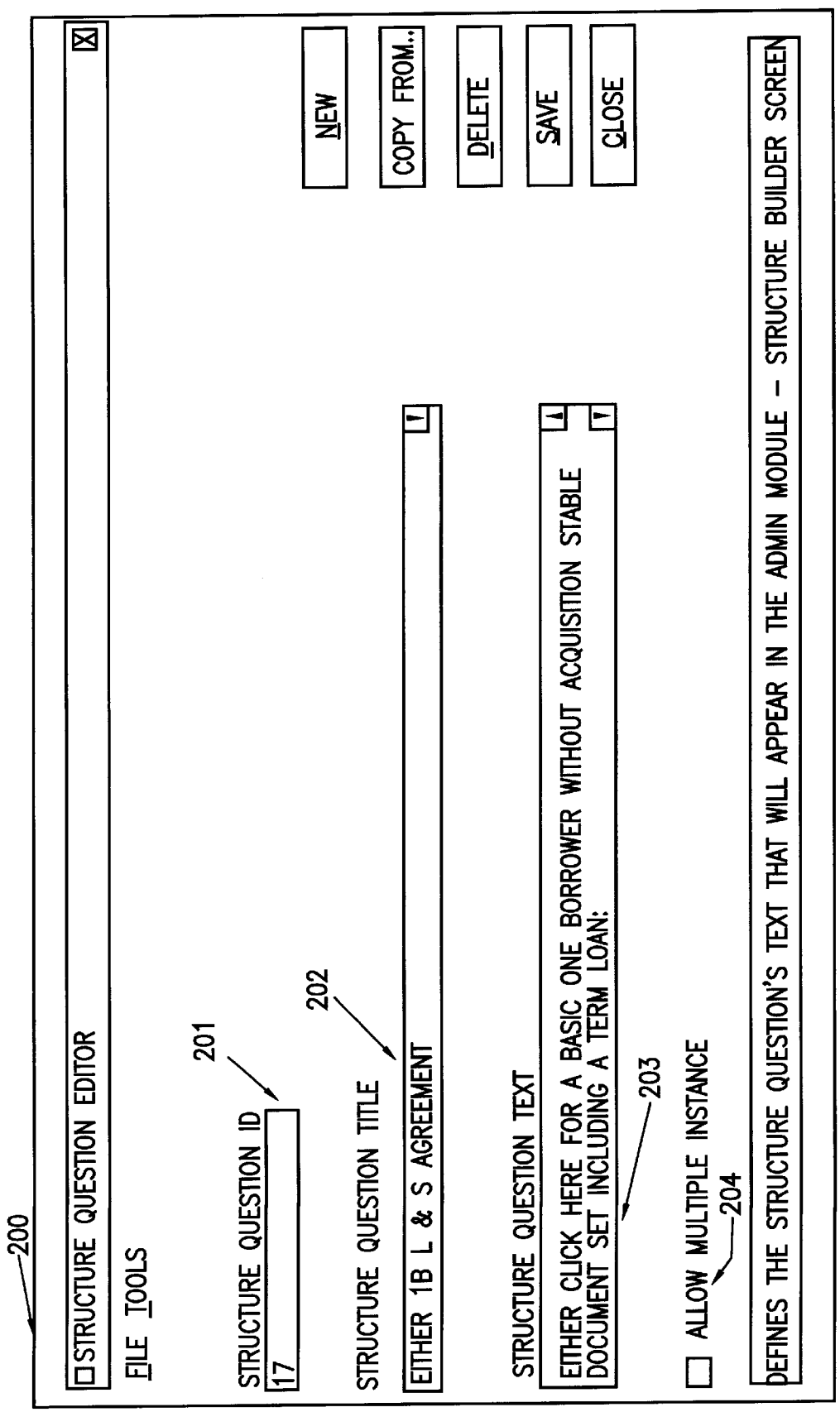

Referring to FIG. 2, the administration module 105 includes a structure question editor tool 200. A script developer can use the structure question editor tool 200 to compose document structure questions. Each document structure question includes structure question text 203. The structure question text 203 states a particular condition that may or may not be relevant to a particular deal. A structure question may also have an associated unique identifier 201, title 202, and instance indicator 204. The identifier 201 and/or title 202 may be used by other script elements to refer to the particular script question or may be displayed to a user or script developer as a short-hand representation of the structure question 203. The instance identifier 204 indicates whether multiple instances (that is, multiple repetitions) of the question may be presented to a user. Multiple instances of a structure question may be presented to the user when a particular document text segment is to be repeated at multiple locations in an output document. For example, an output documents 109 may have a variable number of signatories. A separate instance of a structure question may be used to obtain structure information for each of the signatories. Each instance may, in turn, be a hierarchically arranged parent question having its own child questions.

Figure 3:
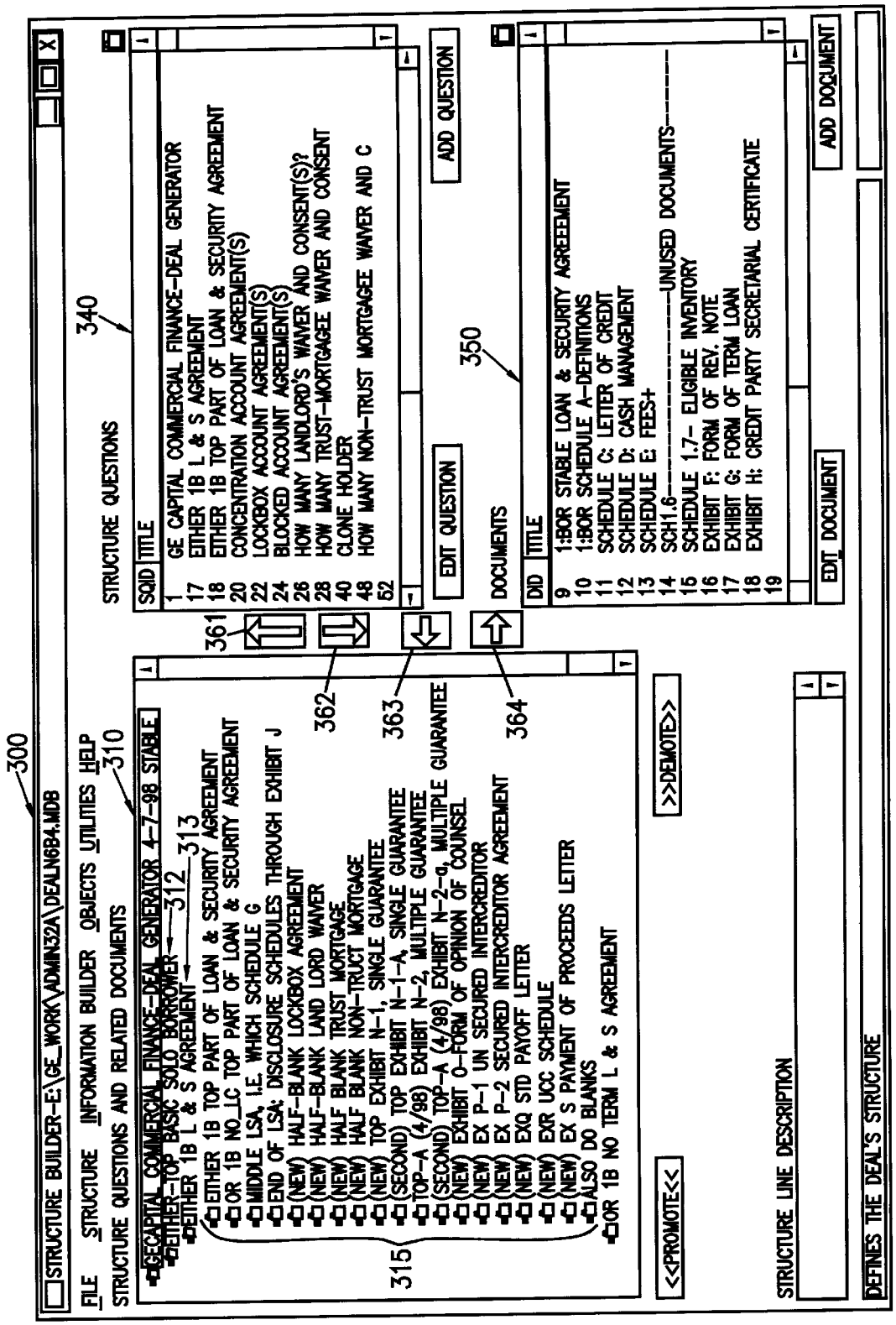

Referring to FIG. 3, the administration module 105 includes a structure builder tool 300 to create and organize document structure elements. Document structure elements associate the structure questions created by the structure question editor 200 (FIG. 2) with document text segments. Document text segments are defined using an information builder tool, discussed below. The structure builder tool 300 displays available structure questions in the "Structure Questions" window 340, available document text segments in the "Documents" window 350, and document structure elements in the "Structure Questions and Related Documents" window 310. The windows 310, 340, and 350 can display the structure elements, structure questions, and document text segments using a title or identifier number associated with the displayed items.

To create a new structure element, the script developer selects a structure question from those displayed in the structure question window 340 and may also select a document text segment from those displayed in the document window 350. The script developer then indicates that the selected question and optionally selected text segment are to form a new structure element by clicking on the left arrow button 363. After clicking on the arrow button 363, a new structure element will appear in the "Structure Questions and Related Documents" window 310. The script developer may subsequently alter the sequential order of the structure elements using the order decrement button 361 or order increment buttons 362.

The structure builder tool 300 can be used to define a hierarchical organization of structure elements. A hierarchical organization of structure elements can be used to denote particular structure elements (known as child elements) that depend from another element (known as a parent element) and thereby form parent—child relationships. Parent—child relationships can be used to simplify input at the user module 107 where, for example, deal characteristics expressed by child structure elements are only relevant if a particular parent element is selected.

A script developer can define parent-child structure element relationships by selecting particular structure elements in the window 310 and promoting or demoting the selected elements with respect to the remaining elements in the window 310. Promoting or demoting a structure element alters the display of that element in the window 310. In particular, each demotion of a structure element increases the indentation at which the structure element is presented. For example, in the display 310, structure element 313 is indented relative to structure element 312. This display indicates that structure element 313 is demoted relative to structure element 312 and is a child element of parent element 312. Structure element 313 may, in turn, be a parent element relative to other structure elements. For example, structure element 313 is a parent element relative to the indented group of structure elements 315.

Figure 4:
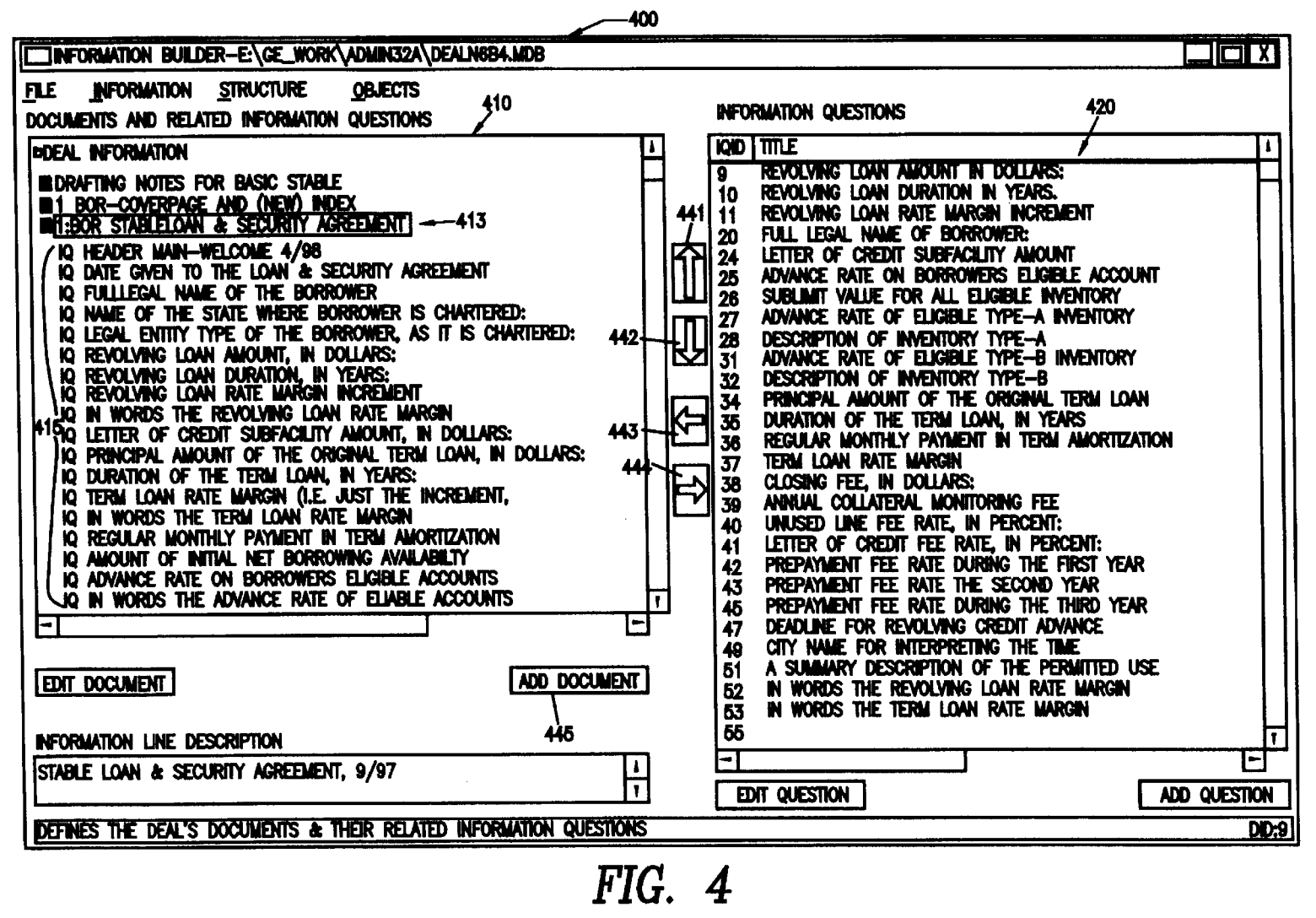

Referring to FIGS. 3 and 4, document segment displayed in the "Documents" window 350 can be created and edited using an information builder tool 400. The information builder tool 400 can associate document text segments residing in a text segment database 101 (FIG. 1) with information questions. The information builder tool 400 includes a "Documents and Related Information Questions" window 410 listing document text segments in the database 101 and their associated information questions, and a window 420 listing information questions that can be associated with a document text segment. Document text segments may be created and stored in the database 101 using, for example, word processing software such as the Microsoft Word® application. Information questions can be defined by the script developer using an information question editor, as discussed below.

The window 410 displays information questions in an indented list format beneath their associated document text segment. For example, the group of information questions 415 are associated with a document indicated by the document title 413. Information questions can be associated with a document text segment by selecting an information question displayed in the window 420, selecting a document text segment displayed in the window 410, and clicking a button 443 to associate the text segment with the information question. The tool 400 also allows the sequence of information questions displayed in the window 410 to be altered. The position of an information question within the displayed sequence of questions can be altered by selecting the question in the window 410 and then selecting the order decrement button 441 or order increment button 442.

Additional document text sections may be listed in the window 410 by selecting the "add document" button 445 and choosing a document text segment from the database 101 (FIG. 1). The add document button 445 may invoke a file or database browser provided by the computer operating system allowing a document text segment file to be selected. Additional information questions may be added to the information question window 520 by defining the new question using an information question editor tool.

Figure 5:
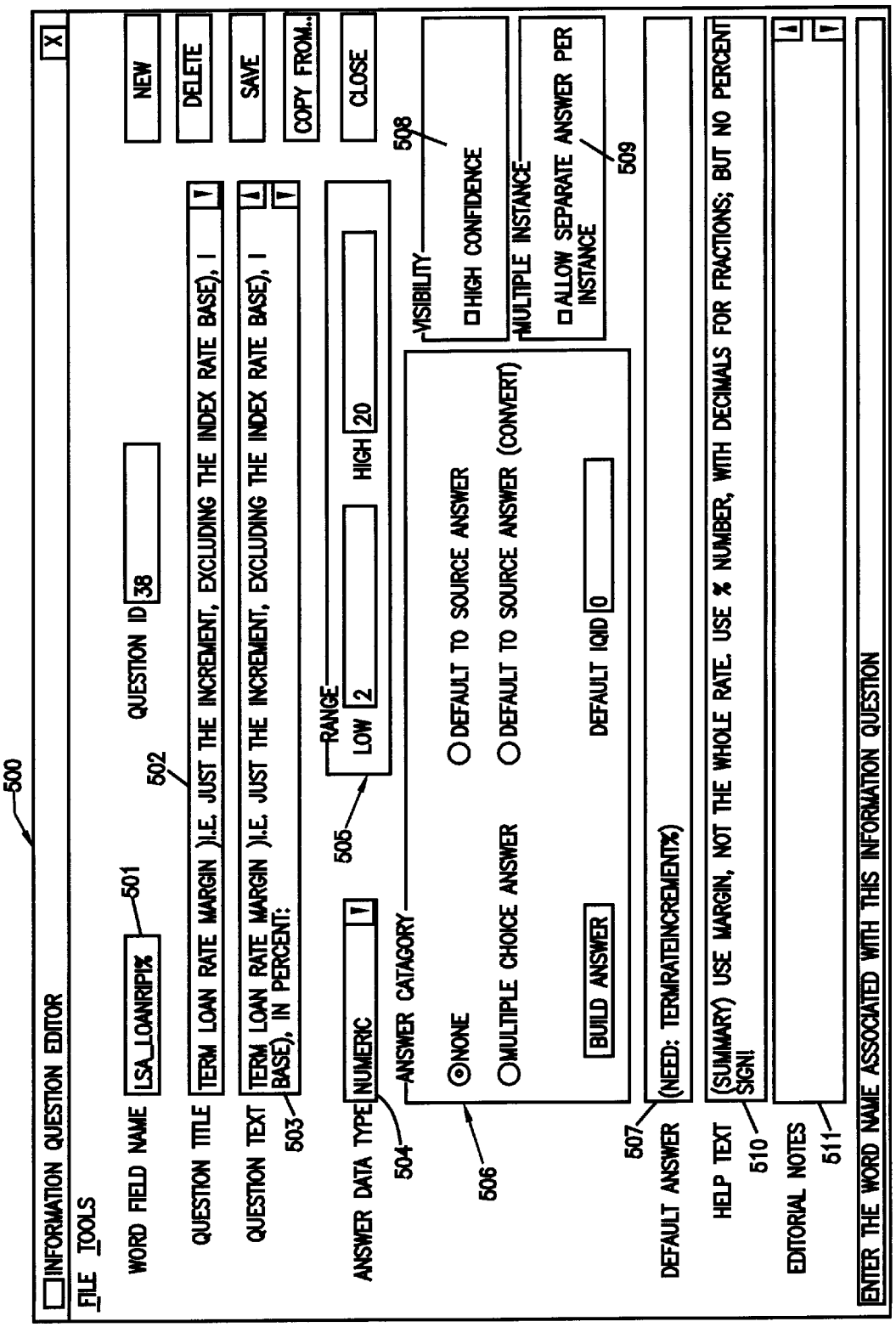
Figure 10:
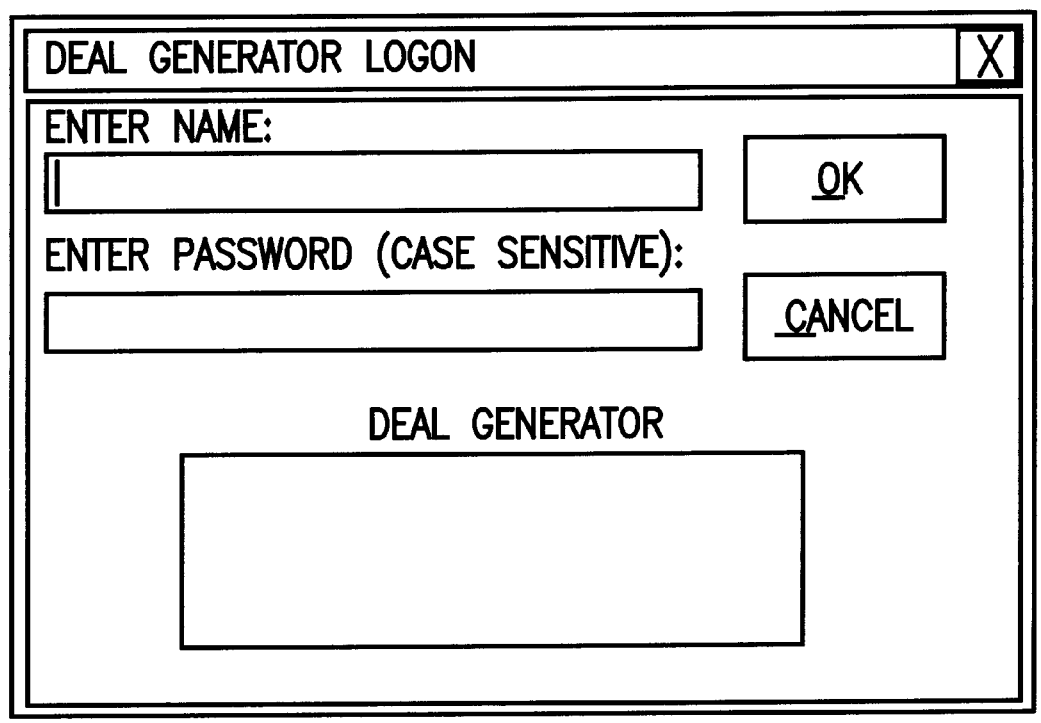

Referring to FIG. 5, the administration module provides an information question editor tool 500 to define and edit information questions. The tool 500 allows the script developer to specify a question title 502, question text 503, and various question response parameters 504–509. The question title 502 may be displayed to a user or script developer as a short-hand representation of the information question. The question text 503 entered by the script developer is used to request the input of an information data element from a user at the input module 107. Additionally, the script developer can specify parameters regulating the response data that will be accepted by a user in response to an information question. Regulating response data may be performed by associating a data type 504 with the question 503. For example, the data type 504 may indicate that the input module 107 should receive currency data, numeric data within a specified range, a text string, or a multiple choice answer. Other data types may also be implemented.

After a script has been developed, it is stored in the script database 103 for access by the deal input module 107. The deal input module 107 presents structure and information questions to a user and receives user data 106 in response. The received user data 106 is stored by the input module 107 in the deal data database 102. FIGS. 6–9 show deal input module 107 display screens illustrating various stages of script processing and user input.

Figure 6:
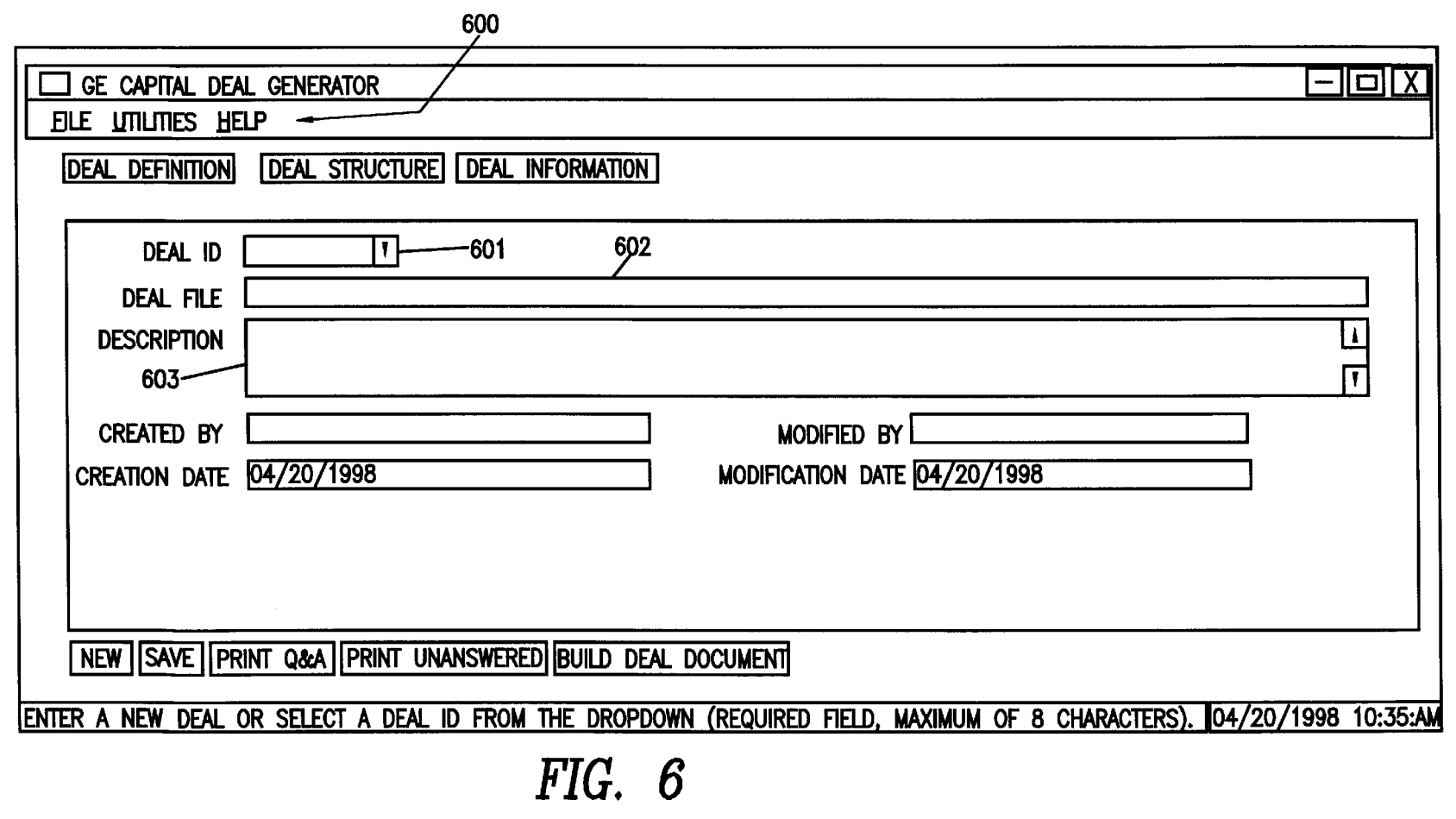

Referring to FIG. 6, script processing may begin with a request for deal definition information. A deal definition tool 600 is used to request and receive various data items that uniquely describe the particular deal or transaction. For example, a unique deal identifier (Deal ID) 601, deal file name 602, or deal description 603 may be received by the tool 600. The deal file name 602 may also be used to indicate where a generated output file 109 (FIG. 1) is to be stored.

The input module 107 may subsequently process document structure elements, present structure questions to the user, and receive structure response data. Referring to FIG. 7, the input module 107 provides a deal structure tool 700 to present structure question text and receive structure response data. In FIG. 7, structure questions 701–712 are presented to the left of associated structure response data items. Each structure response data item is represented by a checked or unchecked box 721–732. Each checked box 722–724, 726–728, and 730–732 indicates that the condition stated by its corresponding structure question 702–704, 7–6–708, and 710–712 is pertinent to the deal being contemplated by the user. Structure questions may be arranged in parent-child relationships. In response to the selection of a parent question, child questions may be displayed. For example, the selection of parent question 706 results in display of child questions 707–711. Prior to the selection of parent question 706 the display of child questions 707–711 may be inhibited to simplify the displayed user interface (not shown). Inhibiting the presentation of particular questions can be used to limit the presentation of irrelevant or misleading information to the user. Following the selection of parent question 706, the display of its child questions may become relevant or necessary. The display of questions 707–711 may then be enabled such that the questions are displayed following parent question 706 as seen in FIG. 7.

After the user has selected a set of structure questions relevant to a particular deal or transaction, the deal input module 107 can determine a set of information questions associated with the selected structure questions. Referring to FIG. 8, the input module 107 provides a deal information tool 800 to present information questions to a user and to receive information element data from the user. The tool 800 displays information questions 801–810 to the left of responses to those questions 811–820. The displayed response values 811–820 may be default response values provided by the document script. For example, referring back to FIG. 5, a default response 507 entered in the information question editor 500 by the script developer can appear as a default response at the deal information tool 800. Alternatively, the user can edit the response values 811–820 using a response value selection and editing function.

After the user has entered deal data at the input module 105, the deal data is stored in the deal database 102 for processing by the document generation module 108. The document generation module 108 accesses the document text segment 101, deal data 102, and script 103 databases to generate an output document 109. To generate the document 109, the module 108 appends text segments together and inserts relevant information elements in the appended text segment.

Figure 11:
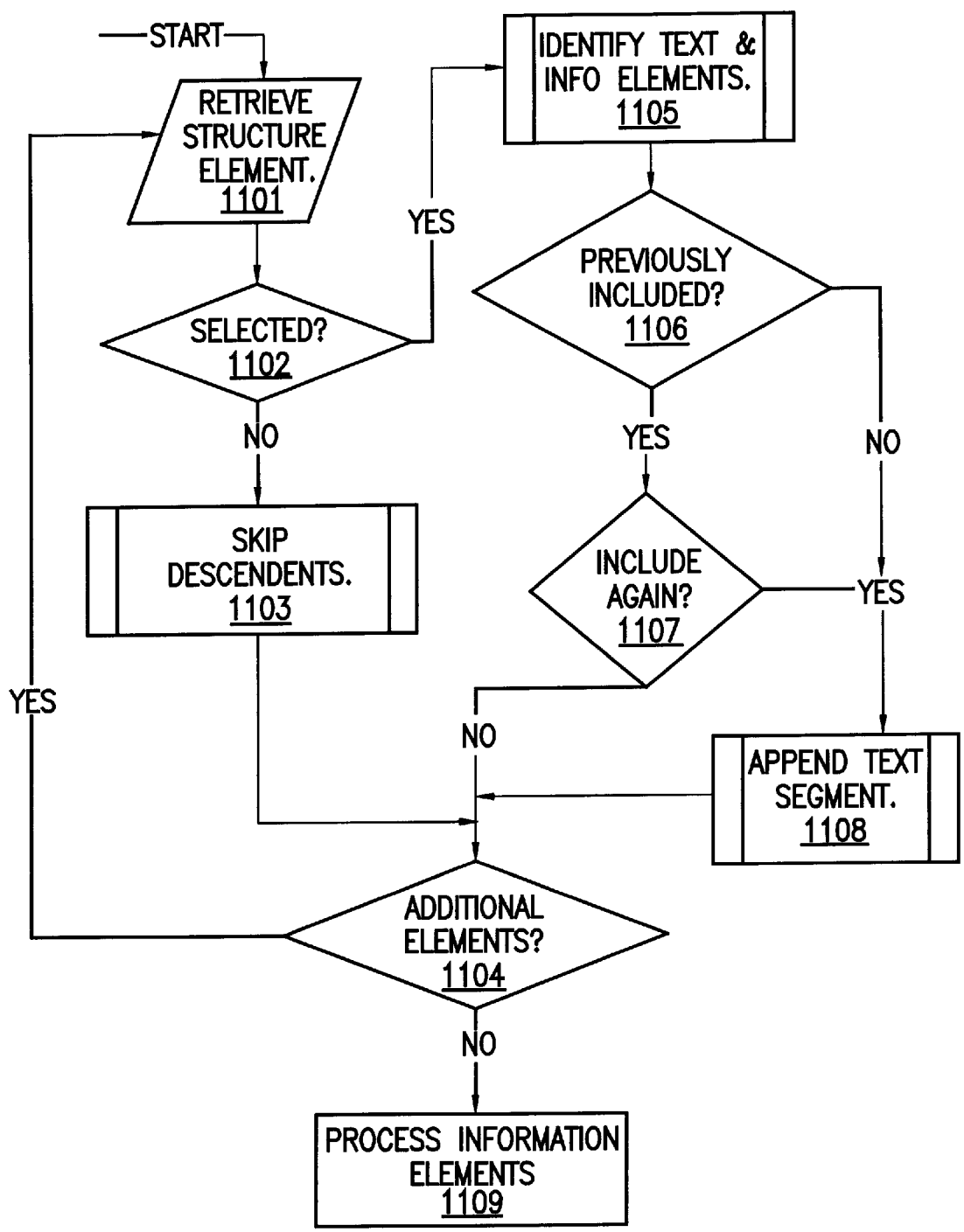
FIGS. 11–12 are flowcharts depicting the generation of a document.

Referring to FIG. 11, the generation module 108 (FIG. 1) may assemble the output document by retrieving the first structure element in the document script (step 1101). Structure response data is then retrieved to determine if the structure element was selected by the user (step 1102). If the structure was not selected, further processing of that structure and its hierarchically related descendents will be skipped (step 1103). The generation module will then process the next remaining structure element (step 1104). If, on the other hand, the structure response data indicates that the structure element was selected (step 1102), the generation module will identify the text segment associated with that element and will identify information element data associated with the text segment (step 1105).

An identified text segment is appended to the output document 109 if it has not been previously included in the output document (steps 1106 and 1108). However, if multiple instances of the text segment are permitted, it will be appended again (steps 1106–1108). The document generation module 108 may continue processing document structure elements until each relevant text segment has been appended to the output document 109. After the various text segments are appended to the output document, the generator module will process the information question response data identified in step 1105 (step 1109). Processing of information question response data is further illustrated in FIG. 12.

Figure 12:
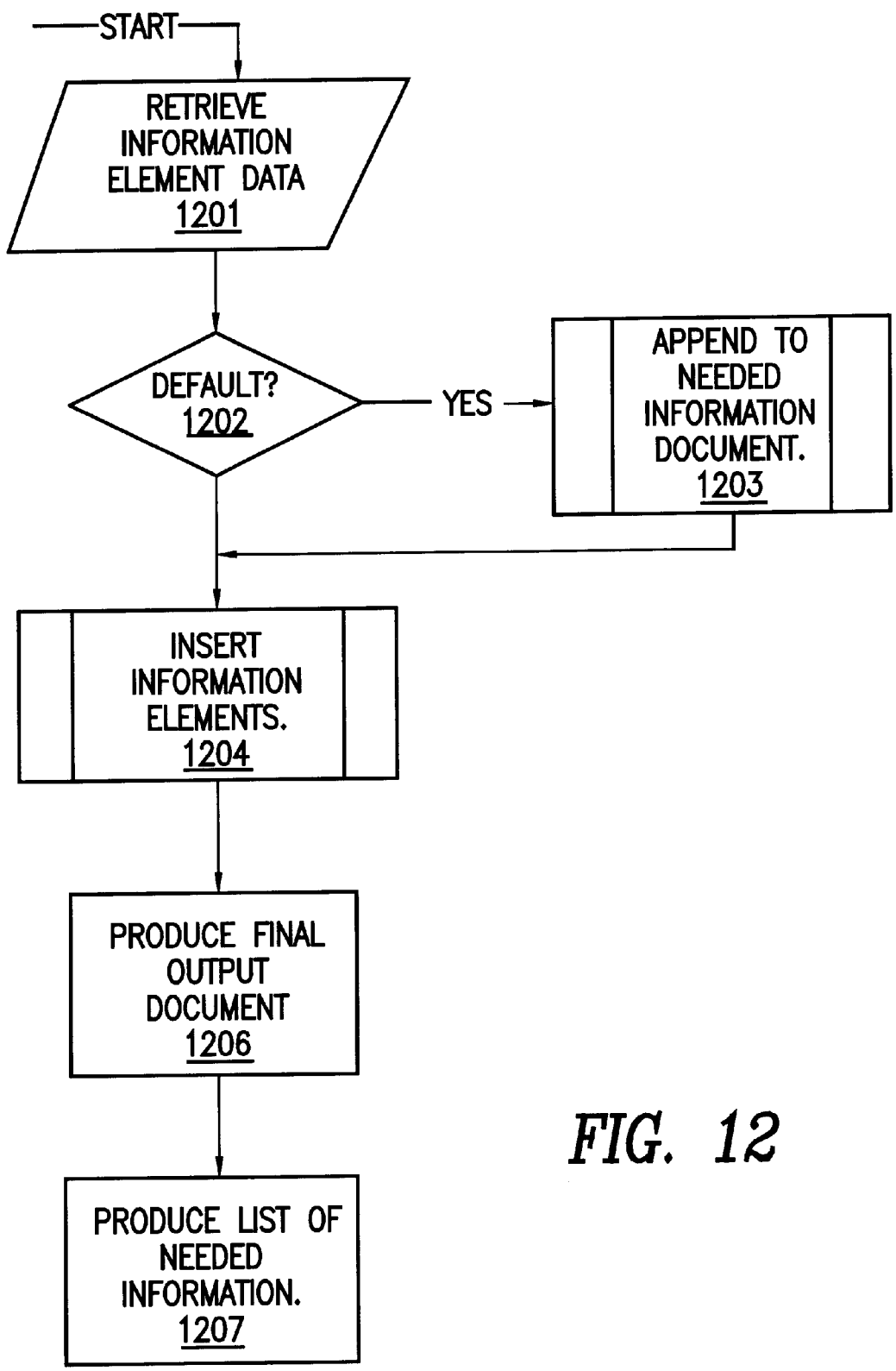

Referring to FIG. 12, to process information element data, the document generator 108 retrieves the information element data items and inserts them at appropriate points in the output document. The information element data values may be retrieved from the deal data database 102 (step 1201). For each information element, the document generator 108 determines whether the element value is a default value (step 1202). If so, the information element may be listed in a needed information document 110 (step 1203). The default or user-entered value of each information element data item may then be inserted at appropriate points in the output document (step 1204). Insertion of the values may be performed using, for example, "Find and Replace" operations in the Microsoft Word® word processing software. Such a "Find and Replace" operation may be controlled using Microsoft Object Linking and Embedding (OLE) procedure calls and may use a matching pattern stored in the document text segment to identify the insertion position of the information element data. Once the information element insertion is complete, a final output document 109 and list of needed information elements can be stored in a database or computer file system (steps 1206 and 1207).

The administration module 105 and document generation module 108 may be used to produce an altered set of documents from data previously entered at the input module 107. This may be done by altering the interrelationships between document script elements using the administration module 105 and re-generating an output document 109. The re-generated output document 109 may be based on data previously input at the input module 107 and stored in the deal database 102. For example, if the text of a particular document text segments is erroneous, that text segment may be edited and the output document 109 re-generated. Similarly, if an alternative arrangement of text segments in the output document 109 is desired, the administration module 105 may be used to reorganize document structure elements. A new output document 109 may then be generated based on data previously stored in the database 102 and the new script elements.

The document generation system 100 may be implemented on a personal computer executing the Microsoft Windows NT or Windows 95 operating system. Portions of the invention may be implemented using commercially available software components. For example, the administrative and input modules 105 and 107 can include a Microsoft Access® database to generate and access document scripts and to store deal data. The document generation module 108 can include Microsoft Access and Microsoft Word® software to generate the output documents 109 and 110. The Access and Word software can interoperate using object linking and embedding (OLE) procedure calls. The OLE procedure calls can be controlled using a program developed in the Microsoft Visual Basic language. The visual basic program can be used to instruct the Microsoft Access database application to issue OLE procedure calls to the Microsoft Word application thereby controlling the assembly of document text sections by the Word application. Additionally, "Find and Replace" functionality in the Word application can be used to insert information element data at appropriate points in the assembly of document text sections.

The document script may include multiple relational database tables. For example, in an implementation using the Microsoft Access database to store document scripts, the tables shown in FIGS. 13–29 may be used to implement the system 100. FIGS. 13–16 illustrate field structures of tables entitled "Structure", "Structure_Question", "Structure_

Group", and "Response." The "Structure", "Structure_Question", "Structure_Group", and "Response" tables control the presentation of structure questions to a user and store the user responses. In particular, the Structure table defines a hierarchical arrangement of structure questions and document text sections. Each structure question is stored as a text string in the "Structure_Question" table. Responses to structure questions are stored as records in the Response table. Additionally, each Structure table record can be associated with a stored document text segment through a pointer to the "Documents" table (described below).

Responses stored in the "Response" table determine document segments included in a generated output document and determine information questions presented to the user. Referring to FIGS. 17–21, the tables "Document", "Question", "Answer", "Doc_to_question" and "LinkQ" identify document segments, store information questions, relate information questions to structure questions, and store user responses to information questions. In particular, each record in the "Document" table identifies a file including storing a document text segment. Each record in the "Question" table stores an information question that may be presented to a user. Document table and Question table records are interrelated through pointers to and from the Doc_to_question table. Answers to information questions are stored in the "LinkQ" table. The Doc_to_question table controls the presentation of the information questions associated with a given text segment.

Data in the tables of FIGS. 13–21 may also be interrelated using the "DealKey" table in FIG. 22. The DealKey table stores data and notations identifying a particular deal being input by a user at the input module 107. In particular, DealKey table records store identifier values that uniquely identify separate deals stored in the deal data database 102.

Referring to FIGS. 23–29, a relational database implementation may include additional tables to allow importing and exporting of data, to aid in maintaining the system 100.

Referring back to FIG. 1, in a security-enhanced implementation of the system 100, the administration module 105, deal input module 107, and document generation module 108 may have different access rights to the databases 101, 102, and 103. For example, the administration module 105 and the document generation module 108 may be able to access each database 101–103 while the deal module 107 may have restricted access to the document text segment database 107. This may be used where, for example, security and privacy concerns require limited access to document text segments by the user of the deal input module 107.

The system 100 may include additional elements to transfer data between databases 101–103 and modules 105, 107, 108. For example, data received from a user by the input module 107 may be sent to the administration module 105, the document generation module 108, or a database server (not shown) by electronic mail (e-mail) prior to storage in the database 102. Alternatively, in an integrated implementation, the administration module 105, deal module 107, document generation module 108 and databases 101–103 may be implemented as an integrated software application executable on a single personal computer. Additional implementations choices may include the use of non-relational databases.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Information in each of databases 101–103 may reside on a single computers or be distributed over a collection of computers. For example, the text segment database 101 may be implemented as a network of computers, each computer storing a partial subset of the available document text segments. Additionally, information in the databases 101–103 can be combined in a single storage representation. For example, the databases 101–103 may be separate tables within a single relational database or may be separate fields within a table record. Furthermore, portions of each databases 101–103 may reside in volatile memory such as RAM memory.

In an icon-based implementation, structure questions and information element questions may be represented by graphical icons representing the particular structure question. For example, an icon of a "Stop" sign may be used in place of text asking a user if the end of a document or logical structure has been reached.

Still other embodiments are within the scope of the following claims.

What is claimed is:

1. A computer-based method of producing a customized package of interrelated documents comprising:

simultaneously displaying a hierarchy of document structure questions at a computer terminal;

in response to the displayed document structure questions, iteratively receiving user input data and dynamically altering the displayed hierarchy based on the received user input data;

processing the user input data using a document script to identify a collection of available modifiable text segments that will be used to form the package of interrelated documents;

by interaction with a user, identifying customization data needed to complete the modifiable text segments; and automatically assembling the customized package of interrelated documents based on computer processing of the document script, said processing comprising incorporating the customization data into the identified collection of modifiable text segments.

2. The method of claim 1 wherein the document script further comprises data associating the available modifiable text segments with information element questions.

3. The method of claim 2 wherein identifying customization data comprises:
   presenting information element questions to a user in accordance with the document script; and
   receiving customization data from the user.

4. The method of claim 2 wherein dynamically altering the displayed hierarchy comprises expanding a hierarchical relationship associated with a first one of the displayed document structure questions to display an additional document structure question.

5. A computer-based method of generating a document modeling script that is computer-processable to produce a customized package of interrelated documents, the method comprising:
   by interaction with a user, receiving at a graphical user interface data identifying a collection of information element questions that will be used to request information element data from a user;
   by interaction with a user, receiving at a graphical user interface data identifying first associations, the first associations being between the collection of information element questions and a collection of available modifiable text segments;
   by interaction with a user, receiving at a graphical user interface data identifying a collection of document structure questions that will be used to request document structure data from a user;
   by interaction with a user, receiving at a graphical user interface data identifying second associations, the second associations being between the collection of document structure questions and ones of the collection of available modifiable text segments; and
   storing data representing the first associations and the second associations in a knowledge base.

6. The method of claim 5 further comprising:
   by interaction with a user, identifying first modified associations between the collection of information element questions and the collection of available modifiable text segment; and
   storing data representing the first modified associations in the knowledge base.

7. The method of claim 6 further comprising:
   by interaction with a user, identifying second modified associations between the collection of document structure questions and the collection of available modifiable text segments; and
   storing data representing the second modified associations in the knowledge base.

8. The method of claim 5 further comprising:
   by interaction with a user, receiving a modifiable text segment and storing the received text segment as a member of the collection of available modifiable text segments.

9. A computer-based method of producing a customized interrelated collection of documents from a body of available document text segments, the method comprising:
   simultaneously displaying a hierarchy of selectable document structure elements, each structure element associated with information content of the collection of documents;
   receiving response data selecting ones of the document structure elements;
   displaying document information element requests, the information element requests being associated with the selected document structure elements;
   receiving user selection data selecting ones of the document information element requests and, for each of said selected information element requests, receiving information element data from a user;
   identifying a collection of document text segments by traversing a knowledge representation structure, the knowledge representation structure associating the collection of document text segments with the selected document structure elements;
   assembling the collection of the document text segments in response to the selected plurality of documents structure elements; and
   producing a customized collection of interrelated document text segments by including the received information element data at predetermined locations in the collection of the document text segments.

10. The method of claim 9 wherein selection of a first one of the document structure elements causes the display of a second selectable document structure element.

11. The method of claim 10 further comprising displaying the second selectable document structure element subordinate to the first document structure element.

12. The method of claim 11 where displaying subordinate comprises displaying the second document structure element at an indented position relative to the first document structure element.

13. The method of claim 9 wherein the document structure elements comprise a first group of structure elements, and wherein selection of a first one of the first group of structure elements inhibits selection of remaining structure elements in the first group of structure elements.

14. The method of claim 9 wherein information element data comprises a text string and wherein including the received information element data at predetermined locations comprises replacing a text pattern stored in a document text segment with the text string.

15. The method of claim 9 wherein the first selectable document structure elements are arranged in a sequential listing and wherein traversing a knowledge representation structure comprises processing the selectable document structure elements according to their position in the sequential listing.

16. The method of claim 9 wherein document structure elements comprise parent structure elements and child structure elements, each child structure element being a logical subordinate of a parent structure element.

17. A computer-based method of producing a customized interrelated collection of documents from a body of available document text segments, the method comprising:
   displaying selectable document structure elements, each structure element associated with information content of the collection of documents, and each document structure elements comprising parent structure elements and child structure elements, each child structure element being a logical subordinate of a parent structure element;
   receiving response data selecting ones of the document structure elements wherein, when the response data identifies a parent structure elements as being selected, display of its child structure elements is enabled and when the response data does not identify the parent structure elements as being selected, display of its child structure elements is inhibited;

displaying document information element requests, the information element requests being associated with the selected document structure elements;

receiving user selection data selecting ones of the document information element requests and, for each of said selected information element requests, receiving information element data from a user;

identifying a collection of document text segments by traversing a knowledge representation structure, the knowledge representation structure associating the collection of document text segments with the selected document structure elements;

assembling the collection of the document text segments in response to the selected plurality of documents structure elements; and producing a customized collection of interrelated document text segments by including the received information element data at predetermined locations in the collection of the document text segments.

18. A computer-based method of customizing a document generation script to computer-enable interrelating of document text segments, the method comprising:

providing a question editor interface;

receiving document structure questions at the question editor interface;

storing the received document structure questions in database records;

providing an interface to receive interrelationship data, the interrelationship data defining interrelationships among selected document structure questions and defining associations between selected document structure questions and selected document text segments;

storing the interrelationship data in database records;

providing an interface to receive information element associations, each information element association defining a data item to be received from a user and designating a document text segments associated with the data item to be received; and storing the information element associations in document generation script database records.

19. The method of claim 18 wherein:

each document structure question comprises a text string and storing document structure questions comprises storing the text string as a question record in the first database; and storing interrelationship data comprises storing a plurality of structure records in the second database, wherein each structure record comprises pointer data to a question record, and wherein selected ones of the structure records further comprising pointer data to other selected other ones of the structure records.

20. The method of claim 18 wherein the database records storing the received structure questions are stored in a first database and the database records storing the interrelationship data are stored in a second database separate from the first database.

21. A computer-based apparatus for generating documentation, the apparatus comprising:

means for identifying a collection of available modifiable text segments that will be used to form a package of customized interrelated documents;

means for identifying customization data needed to complete the modifiable text segments; and means for automatically assembling the customized package of interrelated documents based on the identified collection and customization data.

22. A computer based apparatus for generating a document generation script, the apparatus comprising means for identifying a collection of information element questions used to request information element data from a user;

means for identifying associations between the collection of information element questions and a collection of available modifiable text segments;

means for identifying a collection of document structure questions used to request document structure data from a user; and means for identifying associations between the collection of document structure questions and the collection of available modifiable text segments.

23. A computer program residing on a computer-readable medium, comprising instructions for causing a computer to:

simultaneously display a hierarchy of document structure Questions at a computer terminal;

in response to the displayed document structure questions, iteratively receive user input data and dynamically alter the displayed hierarchy based on the received user input data;

process the user input data to identify a collection of available modifiable text segments;

interact with the user to identify customization data needed to complete the modifiable text segments; and automatically assemble the customized package of interrelated documents based on computer processing of a document script, said processing comprising incorporating the customization data into the identified collection of modifiable text segments.

24. A computer program residing on a computer-readable medium, comprising instructions for causing a computer to:

interact with a user to identify a collection of information element questions that will be used to request information element data from a user;

interact with a user to identify first associations being between the collection of information element questions and a collection of available modifiable text segments;

interact with a user to identify a collection of document structure questions that will be used to request document structure data from a user; and interact with a user to identify second associations between the collection of document structure questions and ones of the collection of available modifiable text segments; and store the first associations and the second associations in a database.

* * * * *